(12) United States Patent
Griesmer et al.

(10) Patent No.: US 12,120,577 B2
(45) Date of Patent: Oct. 15, 2024

(54) LOCATION-BASED COMMUNICATION USING WIRELESS DEVICE

(71) Applicant: AT&T Intellectual Property I, L.P., Atlanta, GA (US)

(72) Inventors: Stephen Griesmer, Westfield, NJ (US); Himanshu Ranpura, Edison, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 351 days.

(21) Appl. No.: 17/661,106

(22) Filed: Apr. 28, 2022

(65) Prior Publication Data
US 2023/0353977 A1 Nov. 2, 2023

(51) Int. Cl.
*H04W 4/024* (2018.01)
*H04W 4/021* (2018.01)
*H04W 4/12* (2009.01)
*H04W 4/24* (2018.01)

(52) U.S. Cl.
CPC .......... *H04W 4/024* (2018.02); *H04W 4/021* (2013.01); *H04W 4/12* (2013.01); *H04W 4/24* (2013.01)

(58) Field of Classification Search
CPC ....... H04W 4/024; H04W 4/021; H04W 4/12; H04W 4/24
See application file for complete search history.

(56) References Cited

U.S. PATENT DOCUMENTS

| | | | | |
|---|---|---|---|---|
| 10,440,509 B1 * | 10/2019 | Weiss | ..................... | H04W 4/022 |
| 10,705,859 B2 * | 7/2020 | Paratey | ..................... | G06F 8/38 |
| 11,379,889 B2 * | 7/2022 | Sanders | ................... | H04W 4/80 |
| 2015/0120455 A1 * | 4/2015 | McDevitt | ........... | G06Q 30/0261 |
| | | | | 705/14.58 |
| 2015/0289095 A1 * | 10/2015 | Sabatelli | ............... | H04W 4/021 |
| | | | | 455/414.2 |
| 2016/0042367 A1 * | 2/2016 | Vastbinder, Jr. | ........ | H04W 4/33 |
| | | | | 705/7.29 |

(Continued)

OTHER PUBLICATIONS

Valinsky, J. "Apple mini stores are coming to some Target", CNN Business, news article dated Feb. 25, 2021, https://www.cnn.com/2021/02/25/business/target-apple-mini-stores/index.html, last accessed Mar. 18, 2022, 3 pages.

*Primary Examiner* — Adam D Houston
(74) *Attorney, Agent, or Firm* — Guntin & Gust, PLC; John G. Rauch

(57) ABSTRACT

Location-based communication using a wireless device (e.g., a mobile device) is enabled. For example, a system can comprise: a processor and a memory that stores executable instructions that, when executed by the processor, facilitate performance of operations, comprising: based on a first network connection of a node of a retail location to network equipment enabling network service for the retail location, determining a first location of the node, based on a second network connection of a mobile device to the network equipment, determining a second location of the mobile device, determining whether a distance between the first location and the second location satisfies a distance threshold, in response to a determination that the distance satisfies the distance threshold, generating message data representative of a message associated with the retail location, and sending the message data to the mobile device, for the message to be presented via the mobile device.

20 Claims, 17 Drawing Sheets

(56) References Cited

U.S. PATENT DOCUMENTS

| | | | |
|---|---|---|---|
| 2016/0171547 A1* | 6/2016 | Sjölund | G06Q 30/0264 |
| | | | 705/14.58 |
| 2016/0180392 A1* | 6/2016 | Liu | G06Q 30/0269 |
| | | | 705/14.53 |
| 2017/0300968 A1* | 10/2017 | Reiver | G06Q 30/0272 |
| 2020/0410539 A1* | 12/2020 | Watt, Jr. | G06Q 30/0261 |
| 2023/0353977 A1* | 11/2023 | Griesmer | H04W 4/24 |

* cited by examiner

LOCATION-BASED COMMUNICATION USING WIRELESS DEVICE

TECHNICAL FIELD

The disclosed subject matter relates to location-based communications and, more particularly, to location-based communication using a wireless device.

BACKGROUND

Physical retailers face increasingly intense competition from online retailers. Consumers have become tethered to their ever-improving mobile devices, making online shopping more and more convenient, thus increasing pressure on physical retailers. Physical retailers and other local businesses are important components of local economies, employing a large portion of the population and generating critical tax revenues. However, it is difficult for physical retailers and other local businesses to compete in the digital age. Reinvigorating old physical locations, or building new ones, can be expensive and can require expensive new wired networking equipment in order bring more technologically sophisticated features into the physical locations.

The above-described background relating to location-based communications is merely intended to provide a contextual overview of some current issues and is not intended to be exhaustive. Other contextual information may become further apparent upon review of the following detailed description.

DETAILED DESCRIPTION

Figure 1:
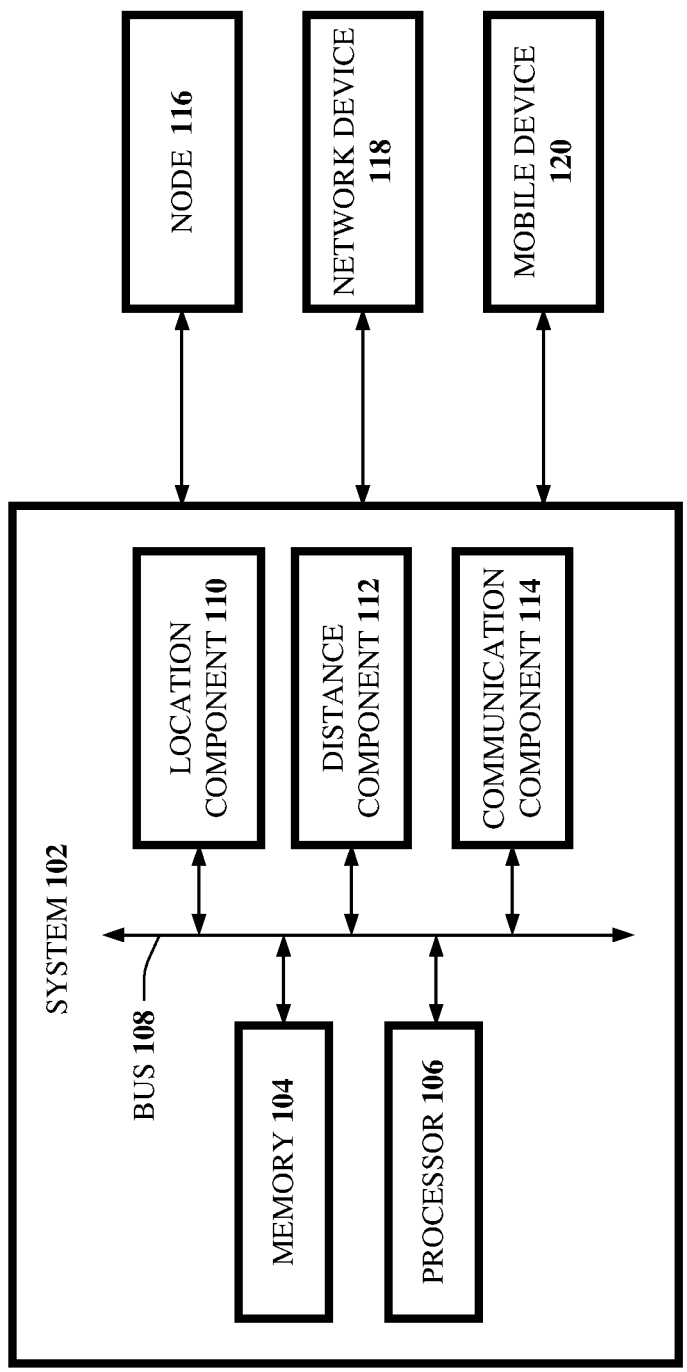
FIG. 1 is a block diagram of an exemplary system in accordance with one or more embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, location-based communications can be improved in various ways, and various embodiments are described herein to this end and/or other ends.

According to an embodiment, a system can comprise a processor, and a memory that stores executable instructions that, when executed by the processor, facilitate performance of operations, comprising: based on a first network connection of a node of a retail location to network equipment enabling network service for the retail location, determining a first location of the node, based on a second network connection of a mobile device to the network equipment, determining a second location of the mobile device, determining whether a distance between the first location and the second location satisfies a distance threshold, in response to a determination that the distance satisfies the distance threshold, generating message data representative of a message associated with the retail location, and sending the message data to the mobile device, for the message to be presented via the mobile device.

In one or more embodiments, the network equipment can comprise radio access network equipment configured for operation according to a fifth generation radio access network protocol. In additional embodiments, the network equipment can comprise radio access network equipment configured for operation according to a sixth generation radio access network protocol.

In various embodiments, the message can comprise a promotional message for an online purchase associated with the retail location. In this regard, the message can be generated based on the distance between the first location and the second location.

In further embodiments, the message can comprise a navigational instruction to an item, associated with the node, located within the retail location. In this regard, the above operations can further comprise: based on a biometric authentication executed via the mobile device, determining whether a user of the mobile device is an authorized user of the mobile device. Further in this regard, sending the message data can comprise sending the navigational instruction to be presented via the mobile device in response to a determination that the user is the authorized user.

In various implementations, the message can comprise a first message. In this regard, the above operations can further comprise: in further response to the determination that the distance satisfies the distance threshold, displaying, via a display device associated with the retail location and based on the message data, a second message. In some embodiments, the display device can comprise an electronic sign. In further embodiments, the display device can comprise the node. In additional implementations, the second message can comprise a promotional message associated with the retail location.

In another embodiment, a non-transitory machine-readable medium can comprise executable instructions that, when executed by a processor, facilitate performance of operations, comprising: determining, via radio access network equipment serving a coverage area comprising a retail location and via a node device attached to an item associated with a retail entity of the retail location, a first location of the item, wherein the first location is within a geofence, and in response to a determination that the item has moved from the first location to a second location, outside of the geofence, generating an alert via an alert device associated with the retail entity.

In various embodiments, the geofence can be a first geofence, the retail entity can be a first retail entity, the second location can be within a second geofence, outside of the first geofence, and the second location can be associated with a second retail entity of the retail location. In further embodiments, the alert can be a first alert and the alert device can be a first alert device. In this regard, the above operations can further comprise: generating a second alert via a second alert device associated with the second retail entity. Further in this regard, the second alert can comprise message data representative of a message to return the item to the first geofence.

In one or more embodiments, the radio access network equipment can comprise radio access network equipment configured to communicate using a new radio network communication protocol.

According to yet another embodiment, a method can comprise: in response to receiving, from a user equipment, a positioning request representative of a request to locate an item, determining, by network equipment comprising a processor and associated with provision of service to a retail location, via a node device attached to the item, a location of the item, and in response to determining the location of the item, sending, by the network equipment, mapping information, representative of a map of the location of the item with respect to the user equipment, to be rendered at the user equipment.

In various embodiments, the above method can further comprise: in response a determination that the user equipment has moved to within a first threshold distance of the location, determining, by the network equipment, whether the user equipment and the item have moved outside of the first threshold distance for a defined duration of time and whether the user equipment and the item have been within a second threshold distance of each other for the defined duration of time, and in response to a determination that the user equipment and the item have moved outside the first threshold distance for the defined duration of time and that the user equipment and the item have been within the second threshold distance of each other for the defined duration of time, billing, by the network equipment, an account registered with the user equipment and the retail location. In some embodiments, the above method can further comprise: in response to a determination that the billing of the account was successfully processed, unlocking, by the network equipment, a lock of the node device from the item.

In an embodiment, the above method can further comprise: in response a determination that the user equipment has moved to within a first threshold distance of the location, determining, by the network equipment, whether the user equipment and the item have moved outside of the first threshold distance and into a geofence, and in response to a determination that the user equipment and the item have moved outside the first threshold distance and into the geofence, billing, by the network equipment, an account registered with the user equipment and the retail location. In some embodiments, the above method can further comprise: in response to a determination that the billing of the account was successfully processed, unlocking, by the network equipment, a lock of the node device from the item.

In one or more embodiments, the network equipment can comprise network equipment that communicates according to at least a fifth generation network communication protocol. In some embodiments, at least the fifth generation network communication protocol can comprise a fifth generation millimeter wave network communication protocol.

It should be appreciated that additional manifestations, configurations, implementations, protocols, etc. can be utilized in connection with the following components described herein or different/additional components as would be appreciated by one skilled in the art.

Turning now to FIG. 1, there is illustrated an example, non-limiting system 102 in accordance with one or more embodiments herein. System 102 can comprise a computerized tool, which can be configured to perform various operations relating to location-based communications. The system 102 can comprise one or more of a variety of components, such as memory 104, processor 106, bus 108, location component 110, distance component 112, and/or communication component 114. In various embodiments, the system 102 can be communicatively coupled to, or can further comprise, node 116, network device 118, and/or mobile device 120. In various embodiments, one or more of the memory 104, processor 106, bus 108, location component 110, distance component 112, communication component 114, node 116, network device 118, and/or mobile device 120 can be communicatively or operably coupled (e.g., over a bus or wireless network) to one another to perform one or more functions of the system 102.

Figure 8:
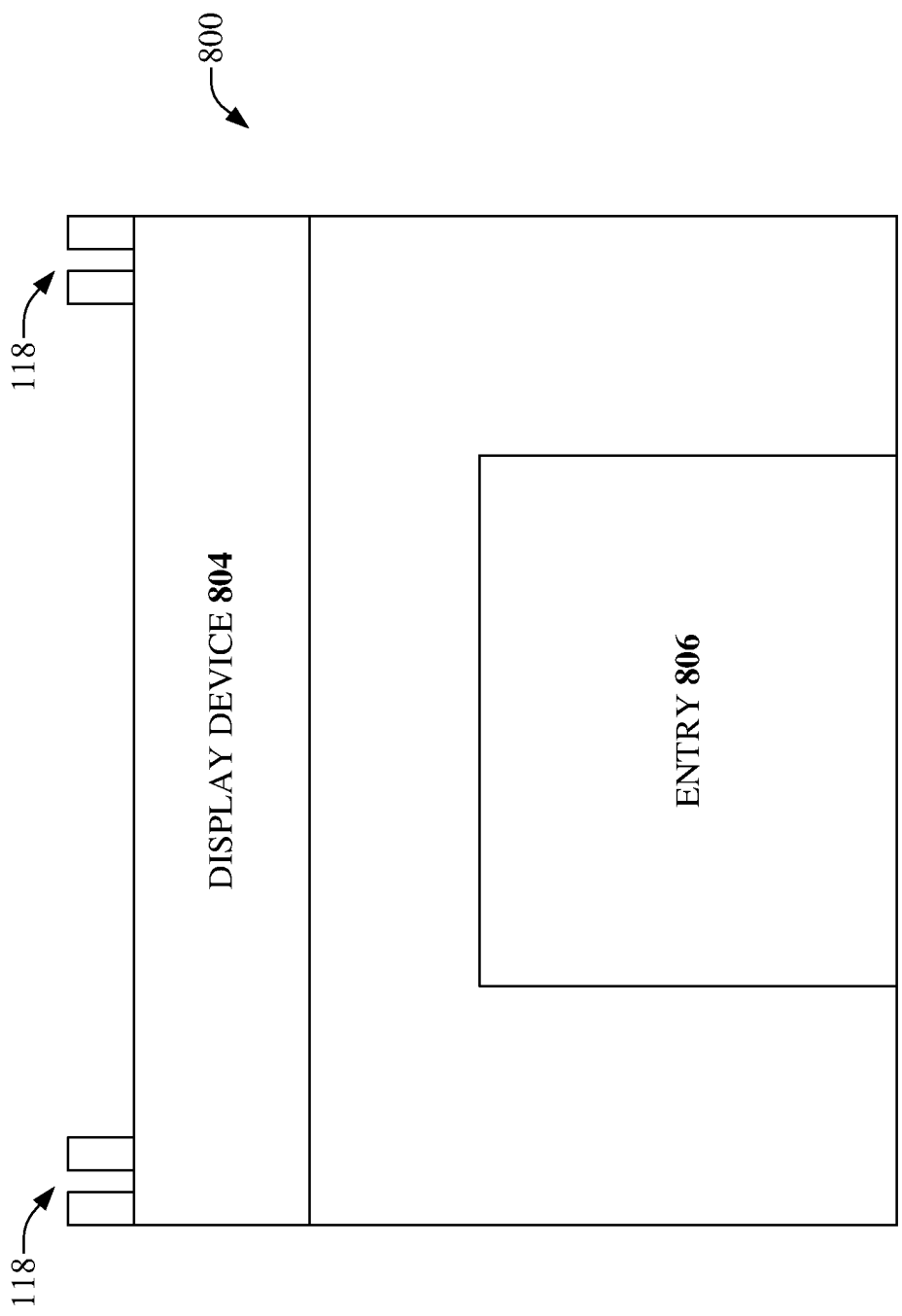
FIG. 8 is a block diagram of an exemplary location in accordance with one or more embodiments described herein.
Figure 9:
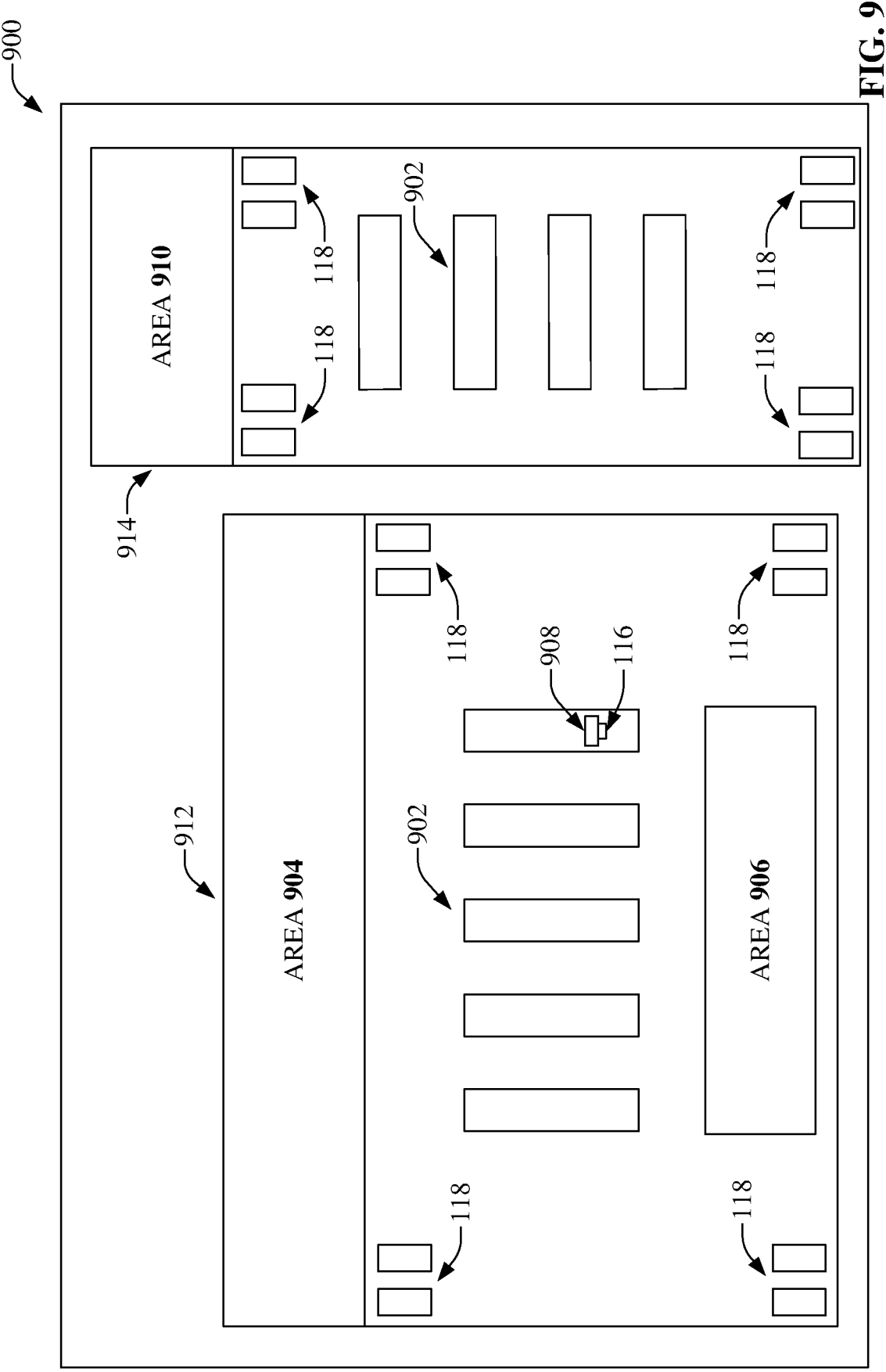
FIG. 9 is a block diagram of an exemplary location in accordance with one or more embodiments described herein.

According to an embodiment, the location component 110 can, based on a first network connection of a node (e.g., node 116) of a retail location (e.g., location 800 or location 900 of FIG. 8 or 9) to network equipment (e.g., network device 118) enabling network service (e.g., fifth-generation network service, such as fifth-generation new radio network service, or sixth generation network service) for the retail location (e.g., location 800 of FIG. 8 or location 900 of FIG. 9), determine a first location of the node (e.g., node 116). In this regard, the first location of the node can comprise a location of the node 116 in or around the retail location. In an embodiment, the location component 110 can, based on a second network connection of a mobile device (e.g., mobile device 120) to the network equipment (e.g., network device 118), determine a second location of the mobile device (e.g., mobile device 120). In this regard, the location component 110, network device 118, and/or network device 118 can determine a location of a mobile device (e.g., mobile device 120) in, around, or near the retail location (e.g., location 800 or location 900).

According to an embodiment, the location 800 can comprise a front (e.g., a storefront) of a location (e.g., a retail location or another type of building). The location 800 can comprise one or more of network device 118. The display device 804 can comprise an electric sign or another suitable display device suitable for displaying a message. In this regard, the display device 804 can comprise a liquid crystal display (LCD), light-emitting diode (LED) display, thin-film transistor (TFT) LCD, quantum dot (QLED) display, organic light-emitting diode (OLED) display, active-matrix organic light-emitting diode (AMOLED) display, a super AMOLED display, or another suitable display. The entry 806 can comprise a door or another suitable entry type.

According to an embodiment, location 900 can comprise an aerial view of a location (e.g., a retail location, such as a building). In this regard, location 900 can comprise an indoor location or an outdoor location. In various embodiments, location 900 can comprise a retail entity 912 (e.g., a first retail entity) and/or a corresponding geofence around the first entity denoted by its perimeter. Similarly, location 900 can comprise a retail entity 914 (e.g., a second retail entity) and/or a corresponding geofence around the second entity denoted by its perimeter. In various implementations, the retail entity 912 and/or the retail entity 914 can each comprise one or more of network device 118 and/or one or more of a shelf 902. According to an example, node 116 can be removably locked or attached to item 908 and stored on a shelf 902 (e.g., of the retail entity 912) (e.g., controlled via a security component 704 as later discussed in later detail). According to an example, area 904 can comprise a storage area (e.g., a back room). In another example, area 906 can comprise a checkout area. Similarly, area 910 can comprise a checkout area or another suitable area.

According to an embodiment, the node 116 can comprise a battery and a cellular radio (e.g., utilizing at least a fifth generation wireless protocol, such as fifth-generation new radio network service or sixth generation network service), which can be communicatively coupled to network device 118 (e.g., also utilizing at least a fifth generation wireless protocol) for location tracking of the node 116 (e.g., using fifth generation new radio location tracking). In one or more embodiments, the node 116 can comprise a lock, security tag, or other anti-theft equipment, which can removably secure the node 116 to an item (e.g., item 908). In various embodiments, the item 908 can comprise an item (e.g., a purchasable item) (e.g., of the retail entity 912) in the location 900 (or location 800 or another suitable location).

According to an embodiment, the network device 118 or network device 118 can comprise a cellular transceiver, such as a fifth generation cellular transceiver, a fifth generation new radio cellular transceiver, a sixth generation cellular transceiver, a base station, a switch, a radio network element, a core network element, an external network element, network device or component. In one or more embodiments, the mobile device 120 can comprise a computer, smart phone, tablet, camera, wearable device, extended reality device, PDA, or another suitable mobile device. In one or more embodiments, the radio access network equipment (e.g., network device 118) can comprise radio access network equipment configured to communicate using a new radio network communication protocol.

According to an embodiment, the distance component 112 can determine whether a distance between the first location and the second location satisfies a distance threshold. Such a distance threshold can comprise a defined distance between the first location and the second location. In this regard, the communication component 114 can, in response to a determination (e.g., by the distance component 112) that the distance satisfies the distance threshold, generate message data representative of a message associated with the retail location (e.g., a first retail entity 912 of the location 900). In an embodiment, the message can comprise a promotional message for an online purchase associated with the retail entity 912, another retail entity, or retail location. In this regard, the message can be generated (e.g., via the communication component 114) based on the distance between the first location and the second location. In further embodiments, such a message can comprise an invitation to enter the store (e.g., retail entity 912), an invitation to make an in-store or online purchase, a coupon, an advertisement (e.g., a target advertisement), a deal, or another suitable message associated with the retail location or retail entity. In various implementations, the message can comprise a geofenced advertisement to bring a passerby intended to encourage a passerby to enter the retail location. In another implementation, the message can comprise a joint advertisement between the retail location or entity and other retailers or retail entities, other than the retail location or the retail entity 912 (e.g., a joint advertisement between the retail entity 912 and the retail entity 914). In an embodiment, the communication component 114 can further send the message data to the mobile device (e.g., mobile device 120), for the message to be presented via the mobile device (e.g., mobile device 120). It is noted that the communication component 114 can comprise the hardware required to implement a variety of communication protocols (e.g., infrared ("IR"), shortwave transmission, near-field communication ("NFC"), Bluetooth, Wi-Fi, long-term evolution ("LTE"), 3G, 4G, 5G, 6G, global system for mobile communications ("GSM"), code-division multiple access ("CDMA"), satellite, visual cues, radio waves, etc.) In various implementations, the network equipment (e.g., network device 118) can comprise radio access network equipment configured for operation according to a fifth generation radio access network protocol. In further embodiments, the network equipment (network device 118) can comprise radio access network equipment configured for operation according to a sixth generation radio access network protocol.

Figure 2:
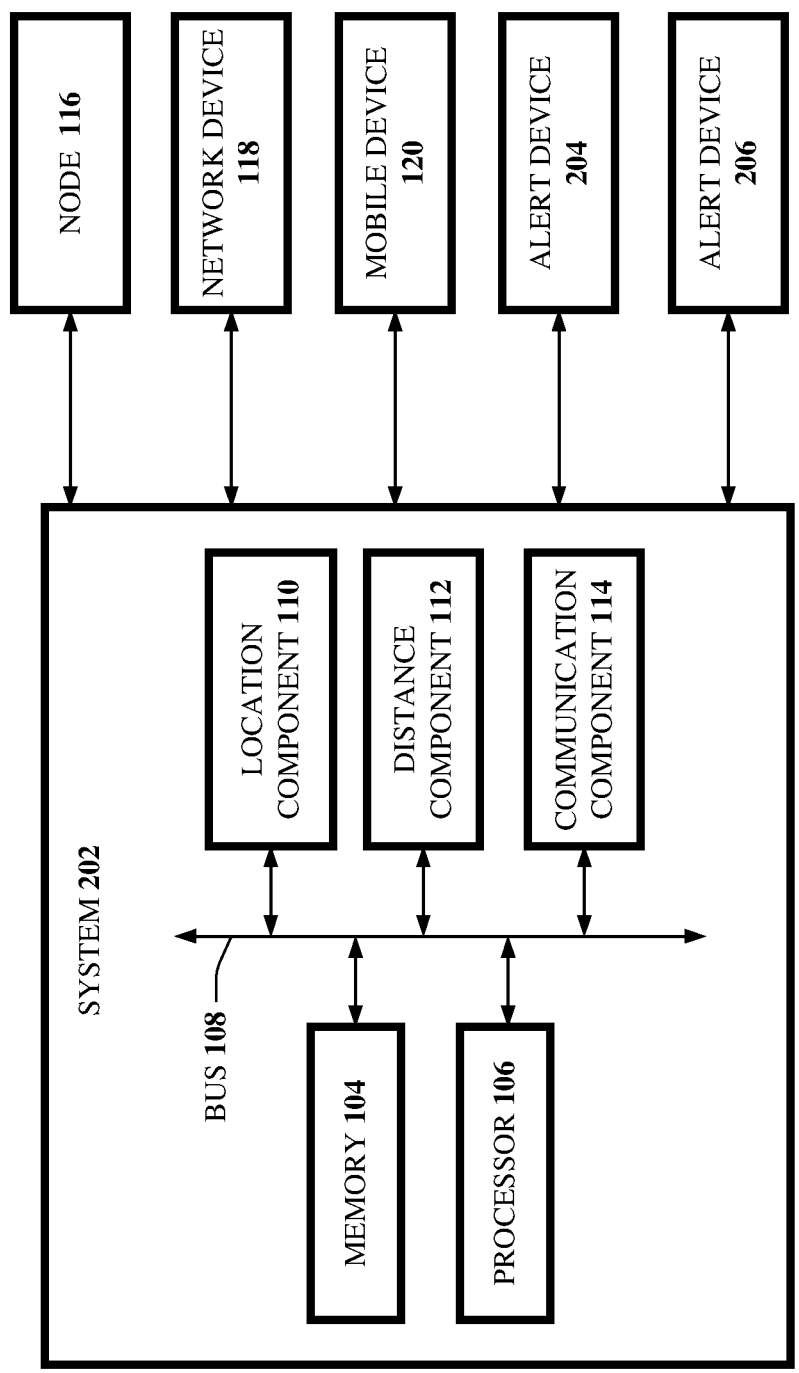
FIG. 2 is a block diagram of an exemplary system in accordance with one or more embodiments described herein.

Turning now to FIG. 2, there is illustrated an example, non-limiting system 202 in accordance with one or more embodiments herein. System 202 can comprise a computerized tool, which can be configured to perform various operations relating to location-based communications. The system 202 can be similar to system 102, and can comprise one or more of a variety of components, such as memory 104, processor 106, bus 108, location component 110, distance component 112, and/or communication component 114. In various embodiments, the system 102 can be communicatively coupled to, or can further comprise, node 116, network device 118, and/or mobile device 120. The system 202 can be communicatively coupled to, or can further comprise, alert device 204 and/or alert device 206. In various embodiments, one or more of the memory 104, processor 106, bus 108, location component 110, distance component 112, communication component 114, node 116, network device 118, mobile device 120, alert device 204, and/or alert device 206 can be communicatively or operably coupled (e.g., over a bus or wireless network) to one another to perform one or more functions of the system 202.

According to an embodiment, the location component 110 can determine, via radio access network equipment (e.g., network device 118) serving a coverage area comprising a retail location (e.g., location 800 or location 900) and via a node device (e.g., node 116) attached to an item associated with a retail entity (e.g., a retail entity 912) of the retail location, a first location of the item, wherein the first location is within a geofence (e.g., associated with the first retail entity 912). According to an embodiment, the communication component 114 can, in response to a determination (e.g., by the location component 110) that the item has moved from the first location to a second location, outside of the geofence, generate an alert via an alert device (e.g., alert device 204) associated with the retail entity. In one or more embodiments, the geofence can be a first geofence, the retail entity can be a first retail entity, the second location can be within a second geofence, outside of the first geofence, and the second location can be associated with a second retail entity (e.g., the retail entity 914) of the retail location. In this regard, the alert can be a first alert and the alert device (e.g., alert device 204) can be a first alert device. Further in this regard, the communication component 114 can generate a second alert via a second alert device (e.g., alert device 206) associated with the second retail entity (e.g., retail entity 914). It is noted that, in various implementations, the second alert can comprise message data representative of a message to return the item to the first geofence. In various implementations, retail entity 912 can comprise a corresponding geofence (e.g., a first geofence) around the retail entity 912, denoted by its perimeter. Similarly, retail entity 914 (e.g., another retail entity) can comprise a corresponding geofence (e.g., a second geofence) around the retail entity 914, denoted by its perimeter. In various implementations, an alert device herein (e.g., alert device 204, alert device 206) can comprise an alarm device configured generate an audible, visual, or other kind of alarm signal intended to alert a user or entity to a problem or condition that requires attention (e.g., a potential theft of an item in a store).

Figure 3:
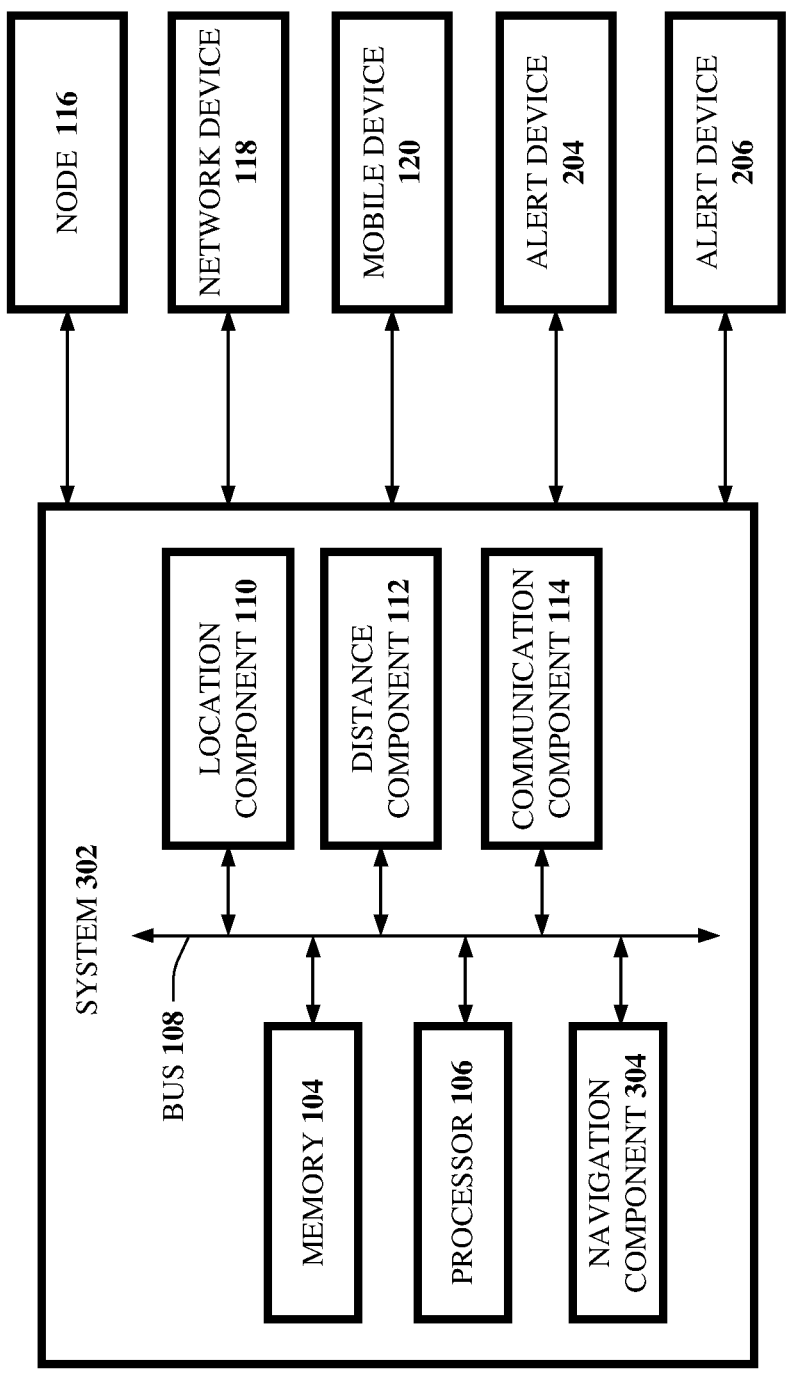
FIG. 3 is a block diagram of an exemplary system in accordance with one or more embodiments described herein.

Turning now to FIG. 3, there is illustrated an example, non-limiting system 302 in accordance with one or more embodiments herein. System 302 can comprise a computerized tool, which can be configured to perform various operations relating to location-based communications. The system 302 can be similar to system 202, and can comprise one or more of a variety of components, such as memory 104, processor 106, bus 108, location component 110, distance component 112, and/or communication component 114. In various embodiments, the system 102 can be communicatively coupled to, or can further comprise, node 116, network device 118, mobile device 120, alert device 204, and/or alert device 206. The system 302 can additionally comprise a navigation component 304. In various embodiments, one or more of the memory 104, processor 106, bus 108, location component 110, distance component 112, communication component 114, node 116, network device 118, mobile device 120, alert device 204, alert device 206, and/or navigation component 304 can be communicatively or operably coupled (e.g., over a bus or wireless network) to one another to perform one or more functions of the system 302.

According to an embodiment, the navigation component 304 can determine navigational instructions between a mobile device (e.g., mobile device 120) and a node 116. For example, the navigation component 304 can leverage fifth generation new radio (e.g., millimeter wave) communication via one or more network device 118 in order to precisely locate the node 116 and node 116, and provide accurate navigational instructions. Such navigational instructions can comprise a live map, presented via the mobile device 120, of the mobile device 120 and the node 116, and can comprise live "turn by turn" instructions. In this regard, a message herein can comprise a navigational instruction (e.g., generated via the navigation component 304) to an item (e.g., item 908), associated with the node (e.g., node 116) (e.g., attached to the node 116), located within the retail entity 912 and/or retail location.

According to another embodiment, the navigation component 304 can generate a navigational instruction for a robot (e.g., a pickup and stocking robot), which can be utilized to gather items from one of more of the shelf 902 and prepare the items for pickup by a customer. Similarly, the navigation component 304 can facilitate navigation of such a robot to stock shelves (e.g., shelf 902).

Figure 4:
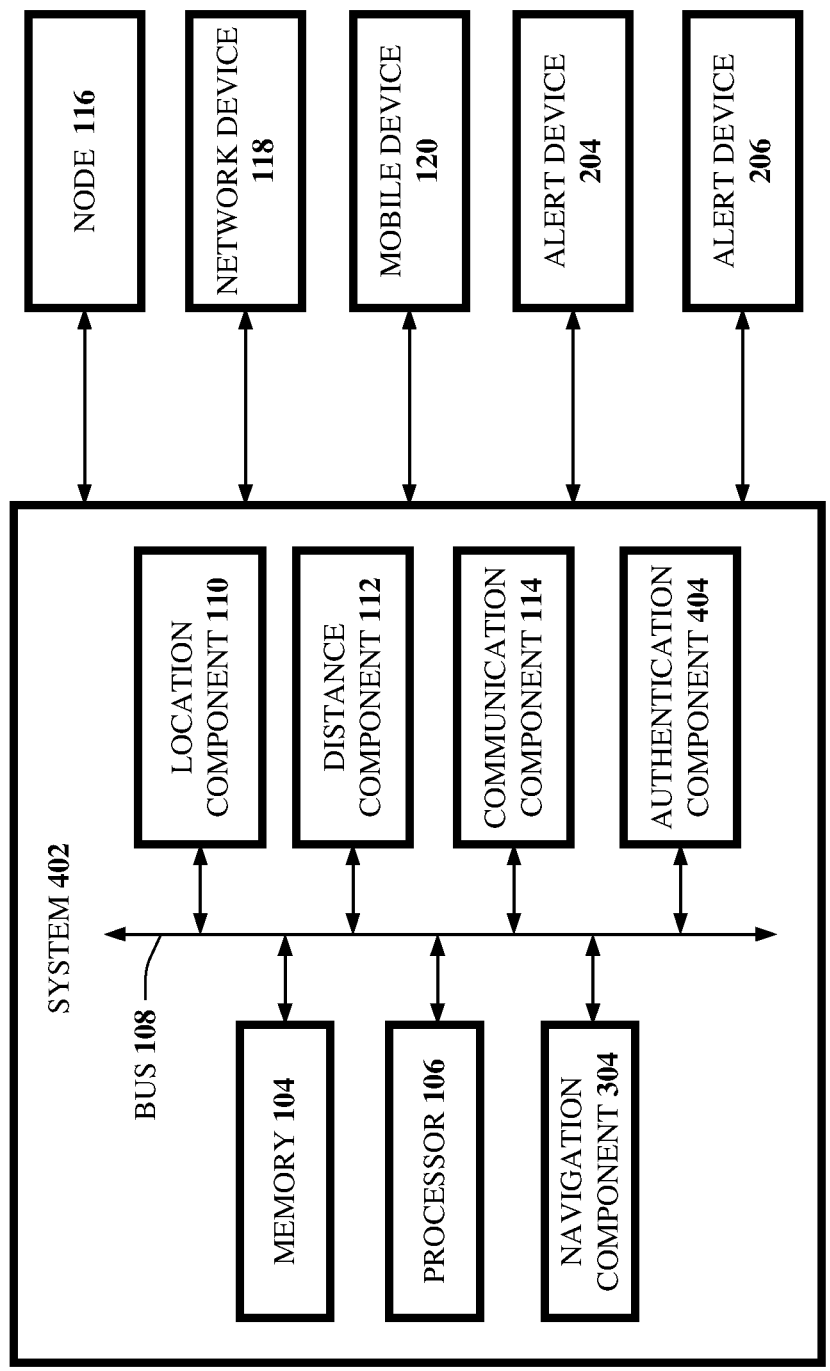
FIG. 4 is a block diagram of an exemplary system in accordance with one or more embodiments described herein.

Turning now to FIG. 4, there is illustrated an example, non-limiting system 402 in accordance with one or more embodiments herein. System 402 can comprise a computerized tool, which can be configured to perform various operations relating to location-based communications. The system 402 can be similar to system 302, and can comprise one or more of a variety of components, such as memory 104, processor 106, bus 108, location component 110, distance component 112, communication component 114, and/or navigation component 304. In various embodiments, the system 102 can be communicatively coupled to, or can further comprise, node 116, network device 118, mobile device 120, alert device 204, and/or alert device 206. The system 402 can additionally comprise an authentication component 404. In various embodiments, one or more of the memory 104, processor 106, bus 108, location component 110, distance component 112, communication component 114, node 116, network device 118, mobile device 120, alert device 204, alert device 206, navigation component 304, and/or authentication component 404 can be communicatively or operably coupled (e.g., over a bus or wireless network) to one another to perform one or more functions of the system 402.

According to an embodiment, the authentication component 404 can, based on a biometric authentication (e.g., executed via the mobile device), determine whether a user of the mobile device 120 is an authorized user of the mobile device 120. Such biometric authentication can comprise a facial scan, palm scan, fingerprint scan, retina scan, iris scan, or another suitable biometric authentication. It is noted that authentication herein is not limited to biometric authentication. In this regard, other authentication methods can be utilized, such as via a username and password, authentication applications, pin-code, pattern recognition, two-factor authentication, or other suitable authentication methods (e.g., as provided by a trusted source, such as a registered user of the mobile device 120). In this regard, sending the message data (e.g., via the communication component 114) can comprise sending the navigational instruction to be presented via the mobile device (e.g., mobile device 120) in response to a determination (e.g., using the authentication component 404) that the user is the authorized user (e.g., of the mobile device 120). In this regard, the navigation instruction can be presented only to the authorized user (e.g., an owner or authorized user of the mobile device 120). In further embodiments, the authentication component 404 can comprise a biometric scanner of a retail entity or retail location herein. In this regard, the biometric authentication can determine whether a person entering the retail location or retail entity (e.g., retail entity 912) is registered (e.g., via a user profile) with the retail entity 912 (or retail location, such as location 900 or location 800).

Figure 5:
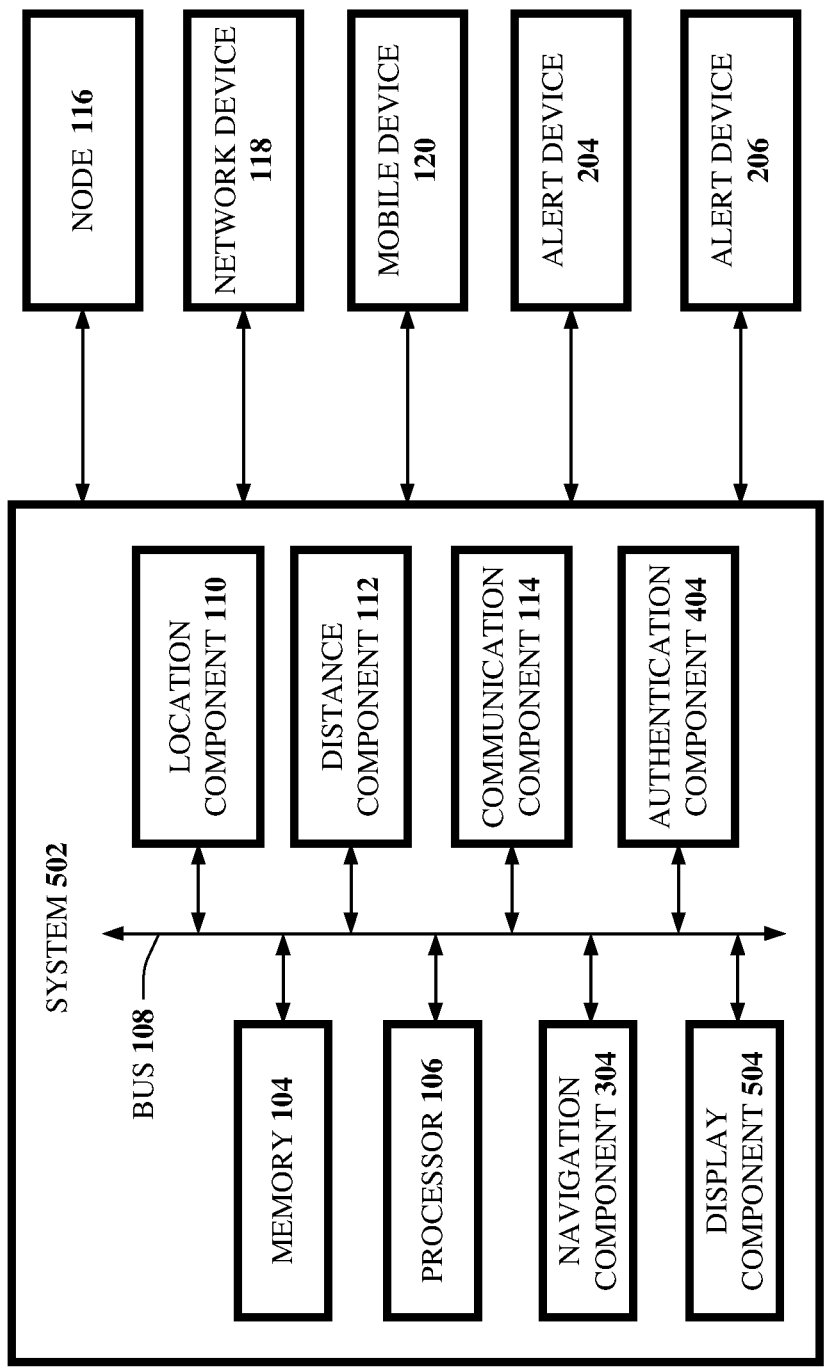
FIG. 5 is a block diagram of an exemplary system in accordance with one or more embodiments described herein.

Turning now to FIG. 5, there is illustrated an example, non-limiting system 502 in accordance with one or more embodiments herein. System 502 can comprise a computerized tool, which can be configured to perform various operations relating to location-based communications. The system 502 can be similar to system 402, and can comprise one or more of a variety of components, such as memory 104, processor 106, bus 108, location component 110, distance component 112, communication component 114, navigation component 304, and/or authentication component 404. In various embodiments, the system 102 can be communicatively coupled to, or can further comprise, node 116, network device 118, mobile device 120, alert device 204, and/or alert device 206. The system 502 can additionally comprise a display component 504. In various embodiments, one or more of the memory 104, processor 106, bus 108, location component 110, distance component 112, communication component 114, node 116, network device 118, mobile device 120, alert device 204, alert device 206, navigation component 304, authentication component 404, and/or display component 504 can be communicatively or operably coupled (e.g., over a bus or wireless network) to one another to perform one or more functions of the system 502.

According to an embodiment, a message herein can comprise a first message. In this regard, in further response to the determination (e.g., by the distance component 112) that the distance satisfies the distance threshold, the display component 504 can display (e.g., via a display device associated with the retail location) (e.g., display device 804) and based on the message data, a second message. In various implementations, the display device 804 can comprise an electronic sign, the node 116, or another suitable display device. Such a display device (e.g., display device 804) can comprise a liquid crystal display (LCD), light-emitting diode (LED) display, thin-film transistor (TFT) LCD, quantum dot (QLED) display, organic light-emitting diode (OLED) display, active-matrix organic light-emitting diode (AMOLED) display, a super AMOLED display, or another suitable display. In one or more embodiments, the second message herein can comprise a promotional message associated with the retail entity (e.g., retail entity 912) or a retail location herein. In various implementations, the second message can comprise an invitation to enter the store (e.g., retail entity), an invitation to make an in-store or online purchase, a coupon, an advertisement (e.g., a target advertisement), a deal, or another suitable message associated with the retail entity (e.g., retail entity 912) or a retail location herein. In various implementations, the message can comprise a geo-fenced advertisement to bring a passerby intended to encourage a passerby to enter the retail location. In another implementation, the message can comprise a joint advertisement between a first retail entity and a second retail entity.

In one or embodiments, the communication component 114 can receive (e.g., from a user equipment such as the mobile device 120) a positioning request representative of a request to locate an item. In this regard, the location component 110 can determine, via a node device (e.g., node 116) attached to the item, a location of the item. It is noted that the location component 110, communication component 114, or another component or system herein can be associated with provision of service to a retail location herein (and/or a retail entity herein). The communication component 114 can, in response to determining (e.g., via the location component 110) the location of the item, send mapping information (e.g., as generated by the navigation component 304) representative of a map of the location of the item with respect to the user equipment, to be rendered at the user equipment (e.g., the mobile device 120). In various embodiments herein, it is noted that the network equipment (e.g., the network device 118, a different device or component, or a system herein) can comprise network equipment that communicates according to at least a fifth generation network communication protocol. In one or more embodiments, the fifth generation network communication protocol can comprise a fifth generation millimeter wave network communication protocol.

Figure 6:
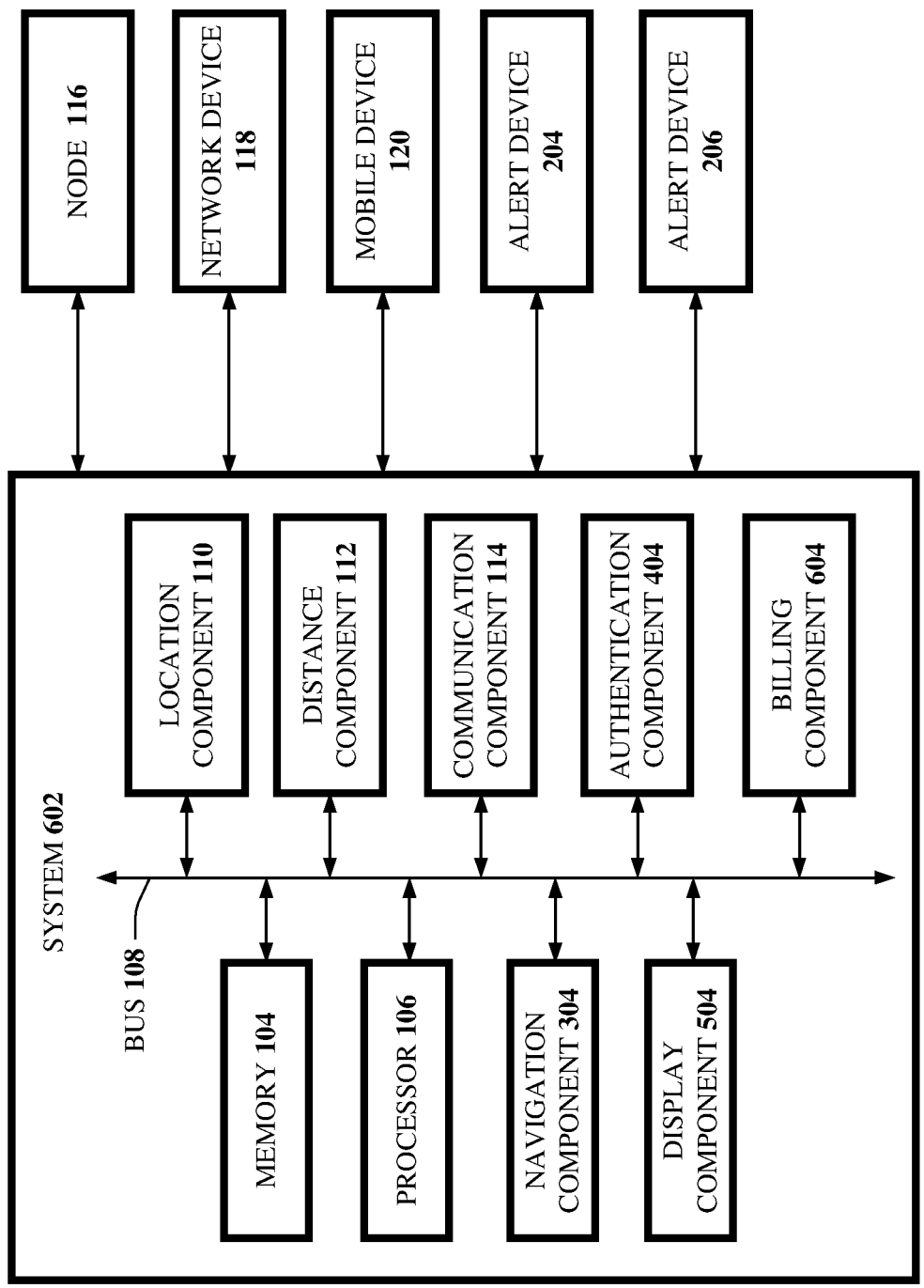
FIG. 6 is a block diagram of an exemplary system in accordance with one or more embodiments described herein.

Turning now to FIG. 6, there is illustrated an example, non-limiting system 602 in accordance with one or more embodiments herein. System 602 can comprise a computerized tool, which can be configured to perform various operations relating to location-based communications. The system 602 can be similar to system 502, and can comprise one or more of a variety of components, such as memory 104, processor 106, bus 108, location component 110, distance component 112, communication component 114, navigation component 304, authentication component 404, and/or display component 504. In various embodiments, the system 102 can be communicatively coupled to, or can further comprise, node 116, network device 118, mobile device 120, alert device 204, and/or alert device 206. The system 602 can additionally comprise a billing component 604. In various embodiments, one or more of the memory 104, processor 106, bus 108, location component 110, distance component 112, communication component 114, node 116, network device 118, mobile device 120, alert device 204, alert device 206, navigation component 304, authentication component 404, display component 504, and/or billing component 604 can be communicatively or operably coupled (e.g., over a bus or wireless network) to one another to perform one or more functions of the system 602.

According to an embodiment, the location component 110 can, in response a determination that the user equipment has moved to within a first threshold distance of the location, determine whether the user equipment and the item have moved outside of the first threshold distance (e.g., a first defined threshold distance) for a defined duration of time and whether the user equipment and the item have been within a second threshold distance (e.g., a second defined threshold distance) of each other for the defined duration of time. In this regard, in response to a determination (e.g., by the location component 110) that the user equipment and the item have moved outside the first threshold distance for the defined duration of time and that the user equipment and the item have been within the second threshold distance of each other for the defined duration of time, the billing component 604 can bill an account registered with the user equipment and the retail location. For example, a customer (and corresponding mobile device 120) can approach an item (e.g., item 908) on a shelf 902 and move within a first threshold distance of an initial location of the item 908 (e.g., as determined via respective wireless connections of the mobile device 120 and node 116 to the network device 118 or other suitable network equipment). The customer can then pick up the item and walk away from the shelf with the item, thus moving outside of the first threshold distance of the initial location of the item 908. If the mobile device 120 and the item 908 are determined to be within a second threshold distance of each other (e.g., for a defined duration of time), it can be determined that the customer intends to keep (e.g., purchase) the item 908, and the billing component 604 can therefore bill the account registered with the user equipment (and/or the retail entity or location). In various embodiments, the billing component 604 can comprise point of sale equipment, which can facilitate a transaction for an item inventory management, or other suitable equipment. It is noted that in various embodiments, if a customer (e.g., associated with the mobile device 120) puts an item (e.g., item 908) back on a shelf 902 (e.g., for a defined period of time), the customer can be refunded or issued a credit (e.g., by the billing component 604) for the item. In various embodiments, the billing component 604 can utilize billing preauthorizations, which can be canceled in response to an item being returned to a shelf, thus preventing the need for a refund. If the item is then removed from the shelf again, for instance, the billing component 604 can reinstitute a preauthorization or again bill the account registered with the user equipment (and/or the retail entity or location).

In an embodiment, the location component 110 can, in response a determination that the user equipment has moved to within a first threshold distance of the location, determine whether the user equipment and the item have moved outside of the first threshold distance (e.g., a first defined threshold distance) and into a geofence (e.g., a geofence associated with a checkout area or representative of leaving a respective store). In this regard, in response to a determination (e.g., by the location component 110) that the user equipment and the item have moved outside the first threshold distance and into the geofence, the billing component 604 can bill an account registered with the user equipment and the retail location. For example, a customer (and corresponding mobile device 120) can approach an item (e.g., item 908) on a shelf 902 and move within a first threshold distance of an initial location of the item 908 (e.g., as determined via respective wireless connections of the mobile device 120 and node 116 to the network device 118 or other suitable network equipment). The customer can then pick up the item and walk away from the shelf with the item, thus moving outside of the first threshold distance of the initial location of the item 908. If the mobile device 120 and the item 908 are determined to enter a geofence (e.g., a geofence associated with a checkout area or an area representative of leaving a respective retail location or retail entity, such as an exit location), it can be determined that the customer intends to keep (e.g., purchase) the item 908, and the billing component 604 can therefore bill the account registered with the user equipment (and/or the retail entity or location).

Figure 7:
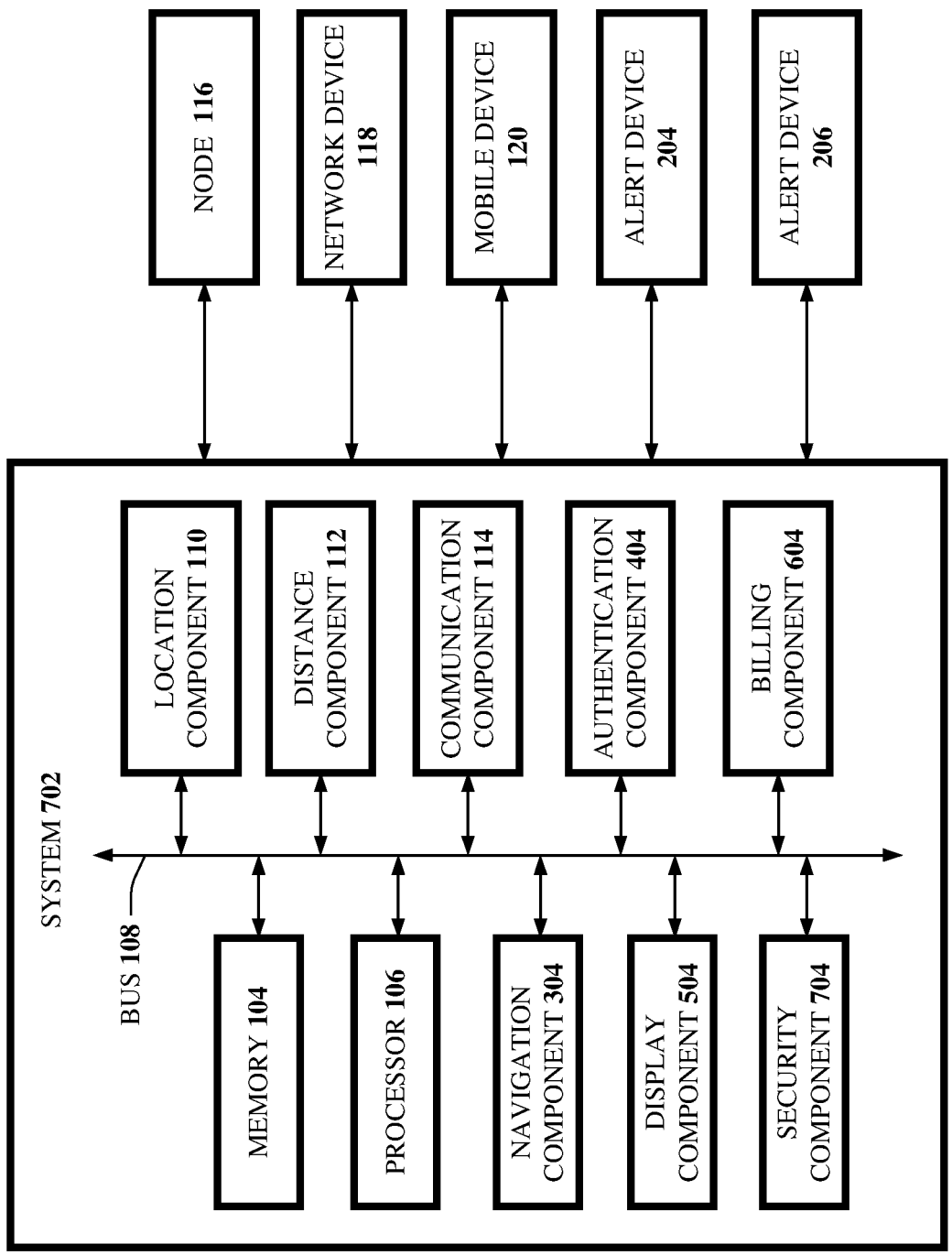
FIG. 7 is a block diagram of an exemplary system in accordance with one or more embodiments described herein.

Turning now to FIG. 7, there is illustrated an example, non-limiting system 702 in accordance with one or more embodiments herein. System 702 can comprise a computerized tool, which can be configured to perform various operations relating to location-based communications. The system 702 can be similar to system 602, and can comprise one or more of a variety of components, such as memory 104, processor 106, bus 108, location component 110, distance component 112, communication component 114, navigation component 304, authentication component 404, display component 504, and/or billing component 604. In various embodiments, the system 102 can be communicatively coupled to, or can further comprise, node 116, network device 118, mobile device 120, alert device 204, and/or alert device 206. The system 702 can additionally comprise a security component 704. In various embodiments, one or more of the memory 104, processor 106, bus 108, location component 110, distance component 112, communication component 114, node 116, network device 118, mobile device 120, alert device 204, alert device 206, navigation component 304, authentication component 404, display component 504, billing component 604, and/or security component 704 can be communicatively or operably coupled (e.g., over a bus or wireless network) to one another to perform one or more functions of the system 702.

According to an embodiment, in response to a determination (e.g., by the billing component 604) that billing of an account (e.g., registered with the user equipment and/or the retail entity or location) was successfully processed, the security component 704 can unlock a lock of the node device (e.g., node 116) from the item 908. In this regard, the node 116 can comprise a lock, security tag, or other anti-theft equipment, which can removably secure the node 116 to an item (e.g., item 908). For example, the billing component 604 determines that a customer has paid for the item 908, the security component 704 can unlock the node 116 from the item 908 so that the customer can leave a retail location and/or use the item without triggering an alarm (e.g., via an alert device herein). According to an embodiment, the security component 704 can utilize biometric or multi-factor authentication (e.g., via the mobile device 120 or of a retail location herein) to increase security (e.g., anti-theft) of the item 908.

Figure 10:
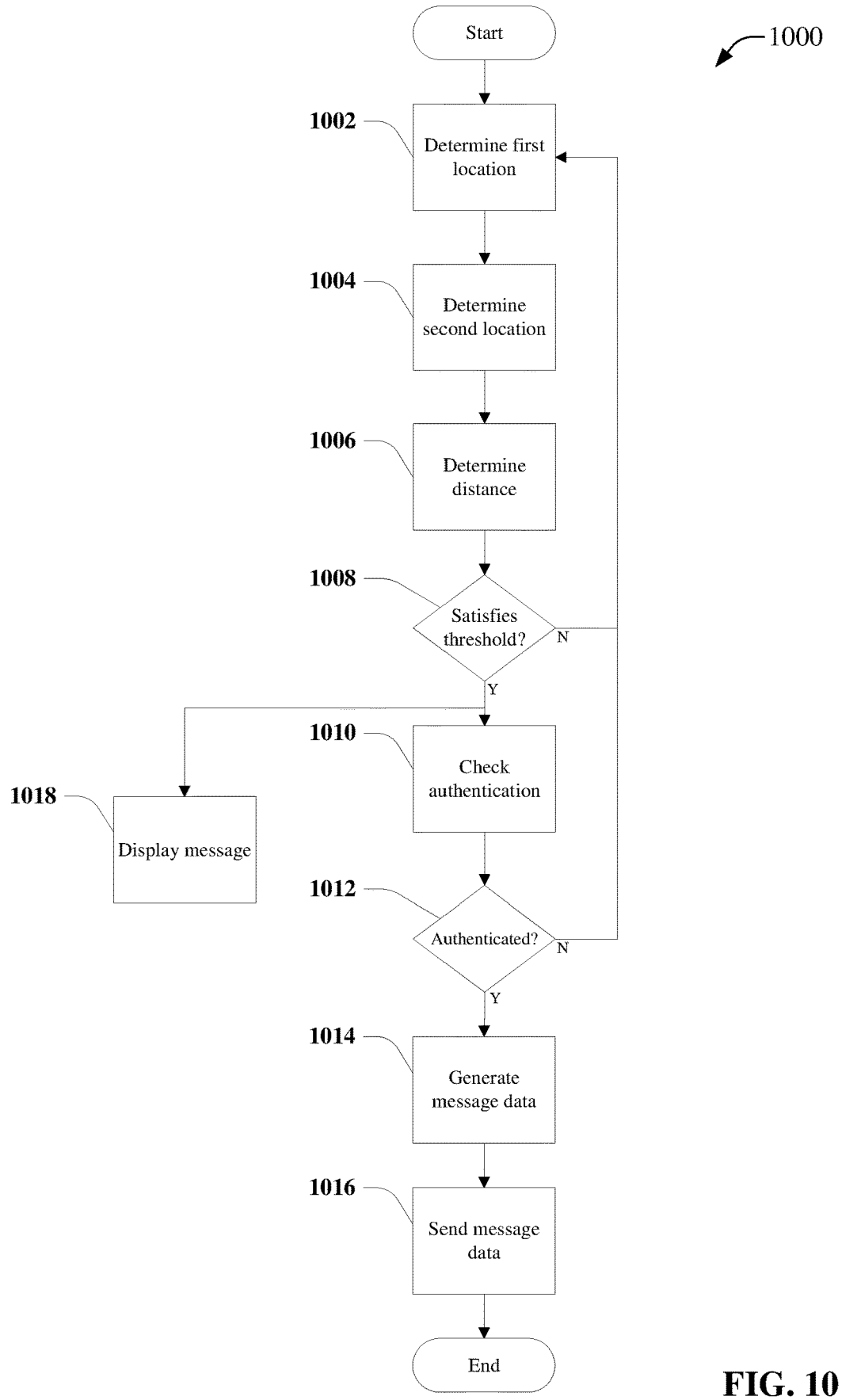
FIG. 10 is a flowchart for a process associated with location-based communications in accordance with one or more embodiments described herein.

Turning now to FIG. 10, there is illustrated a flowchart of a process 1000 relating to location-based communications in accordance with one or more embodiments described herein. At 1002, a first location (e.g., of a node 116 in a retail location) can be determined (e.g., by a location component 110). Such a first location can comprise a location of an item 908 in a retail entity herein or a retail location herein. At 1004, a second location (e.g., of a mobile device 120) can be determined (e.g., by the location component 110). At 1006, a distance between the first location and the second location can be determined (e.g., by a distance component 112). In this regard, the distance between the first location and the second location can comprise a distance between the mobile device 120 and the item 908. At 1008, the distance component 112 can determined whether the distance between the first location and the second location satisfies a distance threshold (e.g., a defined distance threshold). If the distance does not satisfy the distance threshold (e.g., N at 1008) the process can return to 1002. If the distance satisfies the distance threshold (e.g., Y at 1008) (e.g., indicating that the mobile device 120 and the item 908 are sufficiently close) the process can proceed to 1010 and/or 1018. At 1018, a message (e.g., a promotional message for a purchase associated with a retail location) can be generated and displayed (e.g., via a display component 504). In this regard, the message can be displayed on an electric sign or another suitable display device (e.g., display device 804). At 1010, an authentication can be checked (e.g., by an authentication component 404). In this regard, based on a biometric authentication (e.g., executed via the mobile device 120), the authentication component 404 can determine whether a user of the mobile device is an authorized user of the mobile device. If the user of the mobile device is not authenticated (e.g., N at 1012) the process can return to 1002. If the user of the mobile device is authenticated (e.g., Y at 1012) the process can proceed to 1014. At 1014, message data can be generated (e.g., using a communication component 114). Such message data can be representative of a message associated with the retail entity or location, such as an invitation to enter a store, an invitation to make an in-store or online purchase, a coupon, an advertisement (e.g., a target advertisement), a deal, or another suitable message associated with the retail location. In various implementations, the message can comprise a geo-fenced advertisement to bring a passerby intended to encourage a passerby to enter the retail location. In another implementation, the message can comprise a joint advertisement between the retail location or entity and other retailers or entities. At 1016, the message data can be sent (e.g., via the communication component 114) to the mobile device, for the message to be presented via the mobile device (e.g., mobile device 120).

Figure 11:
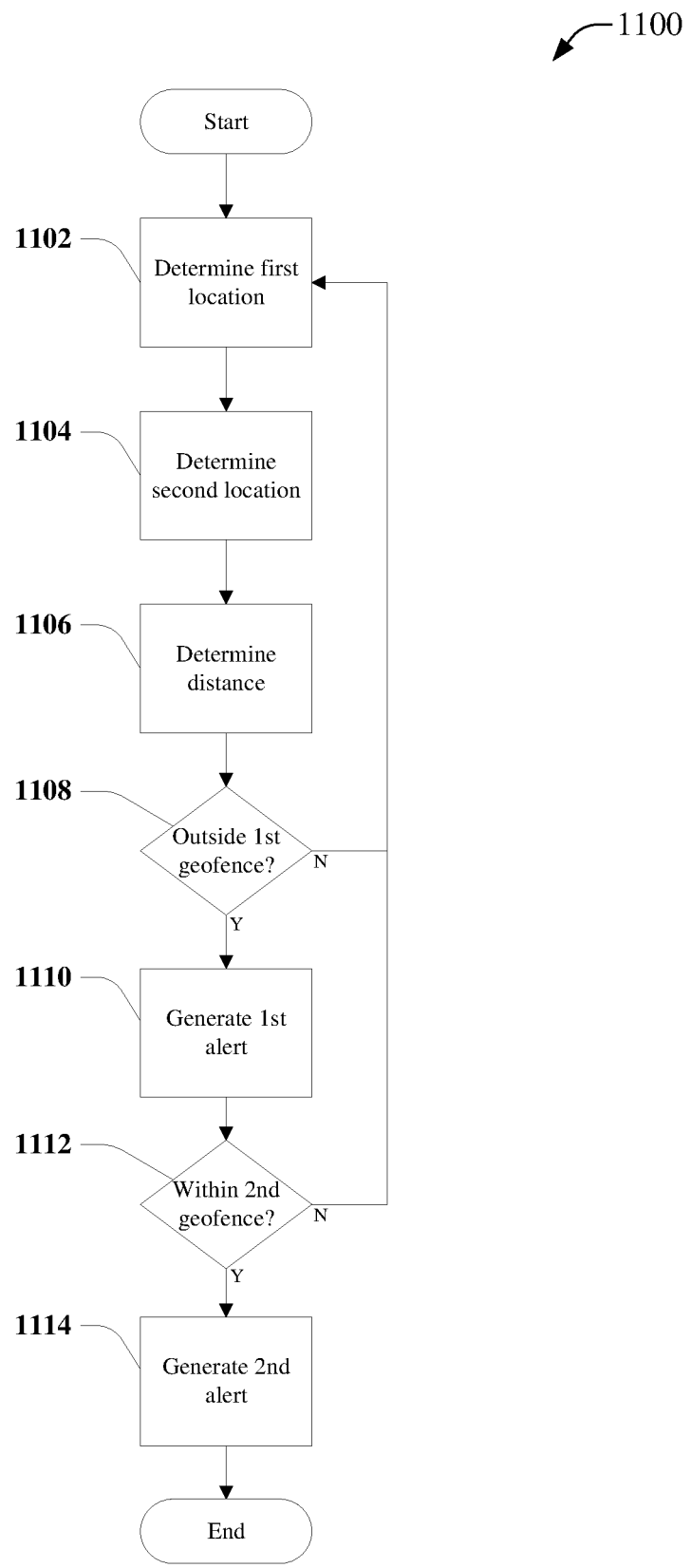
FIG. 11 is a flowchart for a process associated with location-based communications in accordance with one or more embodiments described herein.

Turning now to FIG. 11, there is illustrated a flowchart of a process 1100 relating to location-based communications in accordance with one or more embodiments described herein. At 1102, a first location can be determined (e.g., by a location component 110). Such a first location can comprise a first location of an item 908 associated with a retail entity of a retail location (e.g., and/or a retail entity 912). It is noted that the first location (e.g., an initial location of the item 908) can be located within a first geofence. It is further noted that the first geofence can be associated with the first retail entity 912. At 1104, a second location can be determined (e.g., by the location component 110). Such a second location can comprise a second location of the item 908, different from the first location. At 1106, a distance between the first location and the second location can be determined (e.g., by a distance component 112). At 1108, whether the second location is outside the first geofence can be determined (e.g., by the location component 110). If the second location is not outside the first geofence (e.g., N at 1108) the process can return to 1102. If the second location is outside the first geofence (e.g., Y at 1108) the process can proceed to 1110. At 1110, a first alert can be generated (e.g., by the communication component 114 via an alert device 204). At 1112, whether the second location is within a second geofence (e.g., different from the first geofence) can be determined (e.g., by the location component 110). It is noted that a second geofence can be associated with a second retail entity (e.g., retail entity 914), different from the first retail entity (e.g., retail entity 912). If the second location is not within the second geofence (e.g., N at 1112) the process can return to 1102. If the second location is within the second geofence (e.g., Y at 1112) the process can proceed to 1114. At 1114, a second alert can be generated (e.g., by the communication component 114 via an alert device 206).

Figure 12:
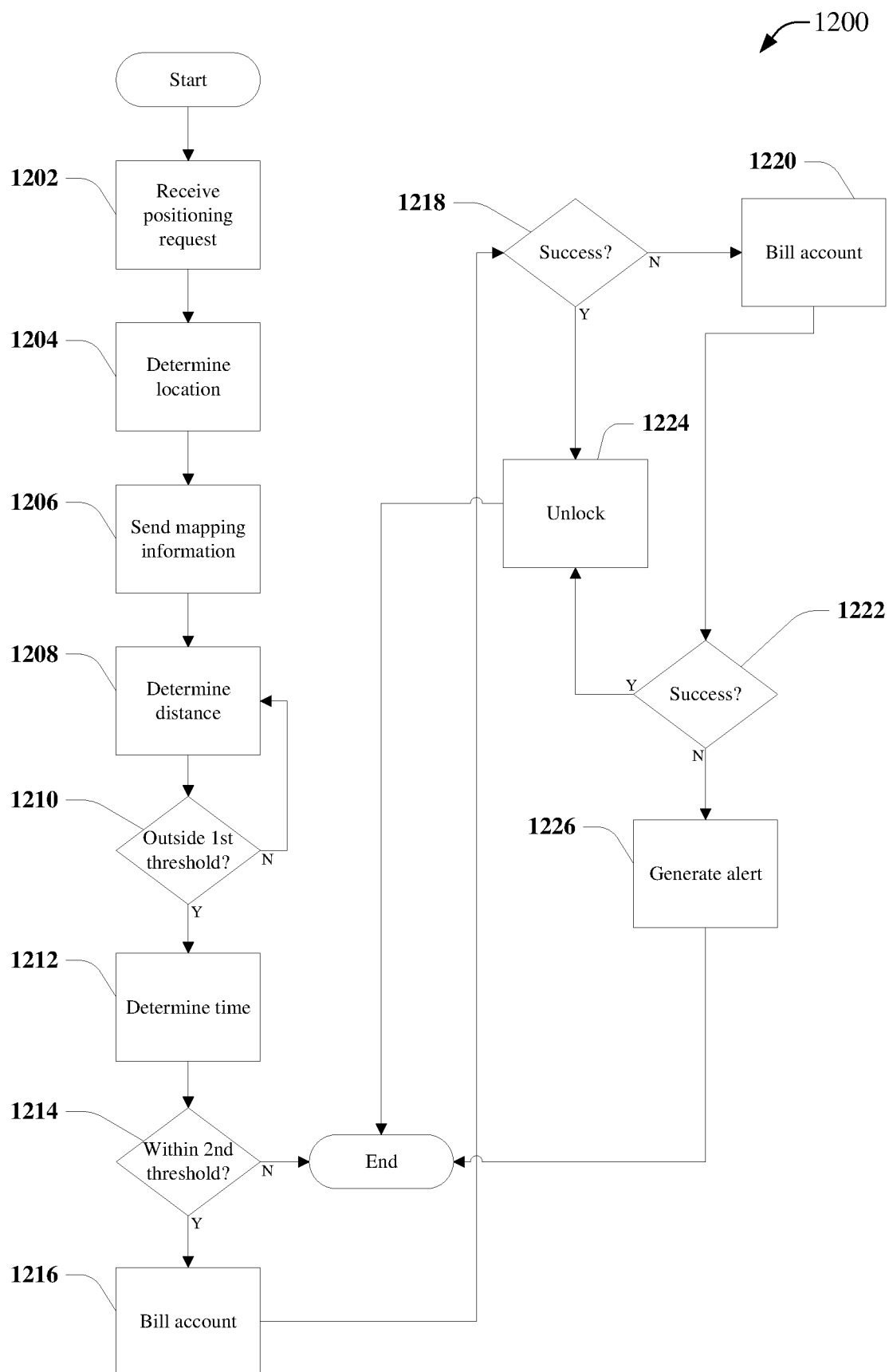
FIG. 12 is a flowchart for a process associated with location-based communications in accordance with one or more embodiments described herein.

Turning now to FIG. 12, there is illustrated a flowchart of a process 1200 relating to location-based communications in accordance with one or more embodiments described herein. At 1202, a positioning request representative of a request to locate an item (e.g., item 908 in a retail location herein) can be received (e.g., via a communication component 114). At 1204, a location of the item 908 can be determined (e.g., by a location component 110) via a node device (e.g., node 116) attached to the item 908. At 1206, in response to the location component 110 determining the location of the item 908, the communication component 114 can send mapping information (e.g., generated by the navigation component 304), representative of a map of the location of the item (e.g., item 908) with respect to the user equipment (e.g., mobile device 120), to be rendered at the user equipment (e.g., the mobile device 120). At 1208, the location component 110 can determine that a distance between the user equipment (e.g., mobile device 120) and the location is within a first threshold distance. For example, a customer (and corresponding mobile device 120) can approach an item (e.g., item 908) on a shelf (e.g., shelf 902) and move within a first threshold distance of an initial location of the item 908 (e.g., as determined via respective wireless connections of the mobile device 120 and node 116 to the network device 118 or other suitable network equipment). At 1210, the location component 110 can determine whether the user equipment moves outside the first threshold distance. For example, the customer can then pick up the item and walk away from the shelf (e.g., shelf 902) with the item (e.g., item 908), thus moving outside of the first threshold distance of the initial location of the item 908. If the user equipment (e.g., mobile device 120) does not move outside the first threshold distance (e.g., N at 1210), the process can return to 1208. If the user equipment (e.g., mobile device 120) does move outside the first threshold distance (e.g., Y at 1210) the process can proceed to 1212. At 1212, an amount of time can be determined (e.g., by the location component 110) that the user equipment (e.g., mobile device 120) has been outside of the first threshold distance and/or that the user equipment (e.g., mobile device 120) and the item (e.g., item 908) have been within a second threshold distance of each other). At 1214, if the user equipment and the item are not within the second distance threshold (e.g., N at 1214), the process 1200 can end. If at 1214, the user equipment and the item are within the second distance threshold (e.g., for the defined duration of time) (e.g., Y at 1214), the process can proceed to 1216. In this regard, it can be determined that the customer intends to keep (purchase) the item 908. At 1216, a billing component (e.g., billing component 604) can bill an account associated with the user equipment (e.g., mobile device 120) and/or with the respective retail entity or retail location. At 1218, whether the billing of the account was successfully processed can be determined (e.g., by the billing component 604). If the billing was successful (e.g., Y at 1218), a lock of the node device can be unlocked from the item (e.g., by a security component 704) at 1224 and the process can end. If at 1218, the billing of the account was not successful (e.g., N at 1218), the process can proceed to 1220. At 1220, the billing component 604 can reattempt to bill the account with the user equipment (e.g., mobile device 120) and the retail entity or location. If the billing was successful (e.g., Y at 1222), a lock of the node device can be unlocked from the item (e.g., by a security component 704) at 1224 and the process can end. If at 1222, the billing of the account was again not successful (e.g., N at 1222), an alert representative of the billing failure can be generated (e.g., by the communication component 114 via an alert device 204 and/or 206) at 1226.

Figure 13:
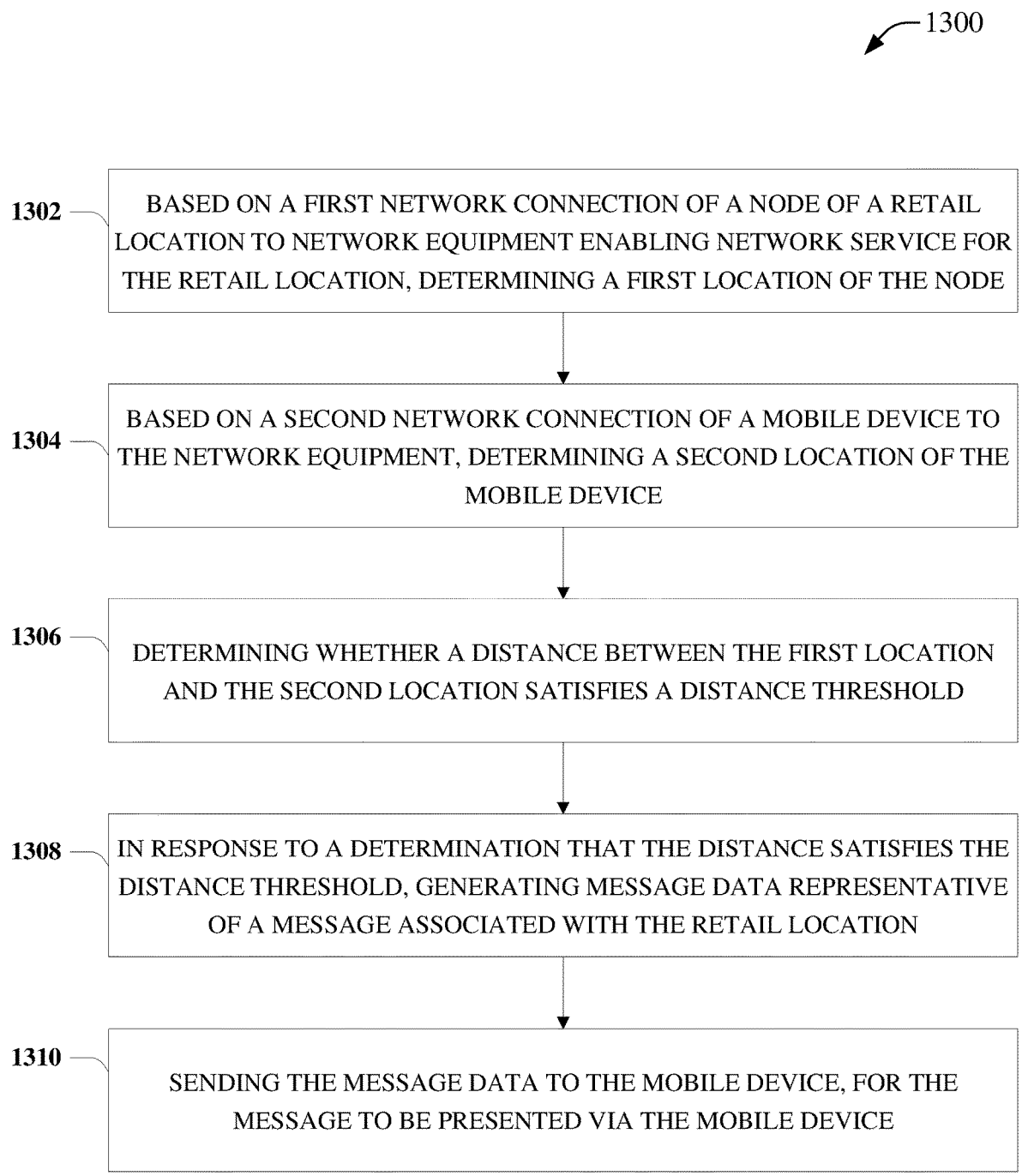
FIG. 13 is a block flow diagram for a process associated with location-based communications in accordance with one or more embodiments described herein.

FIG. 13 illustrates a block flow diagram for a process 1300 associated with location-based communications in accordance with one or more embodiments described herein. At 1302, the process 1300 can comprise, based on a first network connection of a node (e.g., node 116) of a retail location or entity to network equipment (e.g., network device 118) enabling network service for the retail location or entity, determining (e.g., by a location component 110) a first location of the node (e.g., node 116). In this regard, the first location of the node 116 can comprise a location of the node 116 in or around the retail entity or location. At 1304, the process 1300 can comprise, based on a second network connection of a mobile device (e.g., mobile device 120) to the network equipment (e.g., network device 118), determining (e.g., using the location component 110) a second location of the mobile device (e.g., mobile device 120). In this regard, the location component 110, network device 118, and/or network device 118 can determine a location of a mobile device (e.g., mobile device 120) in, around, or near the retail entity location (e.g., retail entity 912, retail entity 914, location 800, or location 900). At 1306, the process 1300 can comprise determining (e.g., by a distance component 112) whether a distance between the first location and the second location satisfies a distance threshold. At 1308, the process 1300 can comprise, in response to a determination (e.g., by the distance component 112) that the distance satisfies the distance threshold, generating (e.g., via a communication component 114) message data representative of a message associated with the retail location. In an embodiment, the message can comprise a promotional message for an online purchase associated with the retail entity or location. In this regard, the message can be generated (e.g., via the communication component 114) based on the distance between the first location and the second location. In further embodiments, such a message can comprise an invitation to enter the store (e.g., a retail entity), an invitation to make an in-store or online purchase, a coupon, an advertisement (e.g., a target advertisement), a deal, or another suitable message associated with the retail location. In various implementations, the message can comprise a geo-fenced advertisement to bring a passerby intended to encourage a passerby to enter the retail location. In another implementation, the message can comprise a joint advertisement between the retail location and another retail location, other than the retail location.

Figure 14:
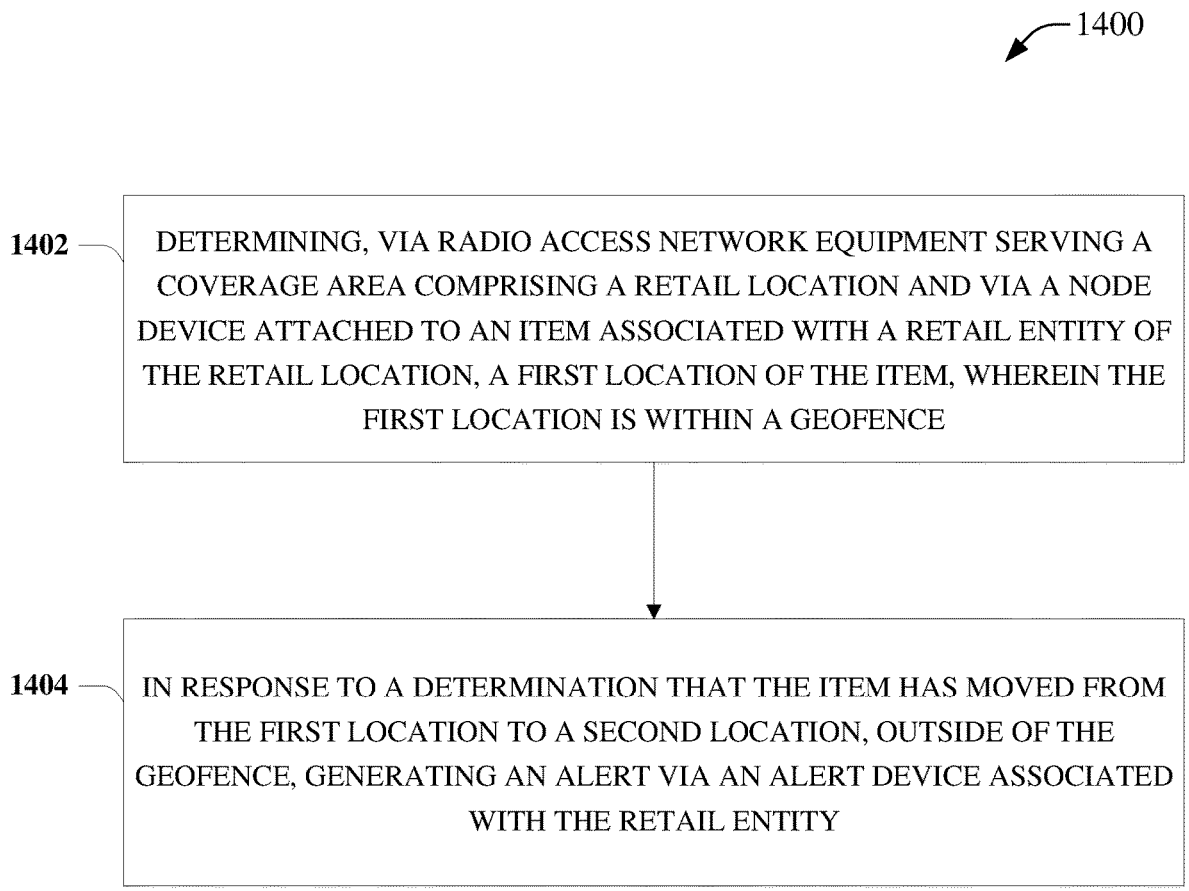
FIG. 14 is a block flow diagram for a process associated with location-based communications in accordance with one or more embodiments described herein.

FIG. 14 illustrates a block flow diagram for a process 1400 associated with location-based communications in accordance with one or more embodiments described herein. At 1402, the process 1400 can comprise determining (e.g., using a location component 110), via radio access network equipment (e.g., network device 118) serving a coverage area comprising a retail location and via a node device (e.g., node 116) attached to an item (e.g., item 908) associated with a retail entity of the retail location, a first location of the item, wherein the first location is within a geofence (e.g., associated with the retail entity 912). At 1404, the process 1400 can comprise, in response to a determination (e.g., by the location component 110) that the item has moved from the first location to a second location, outside of the geofence, generating (e.g., using a communication component 114) an alert via an alert device (e.g., alert device 204 or alert device 206) associated with the retail entity.

Figure 15:
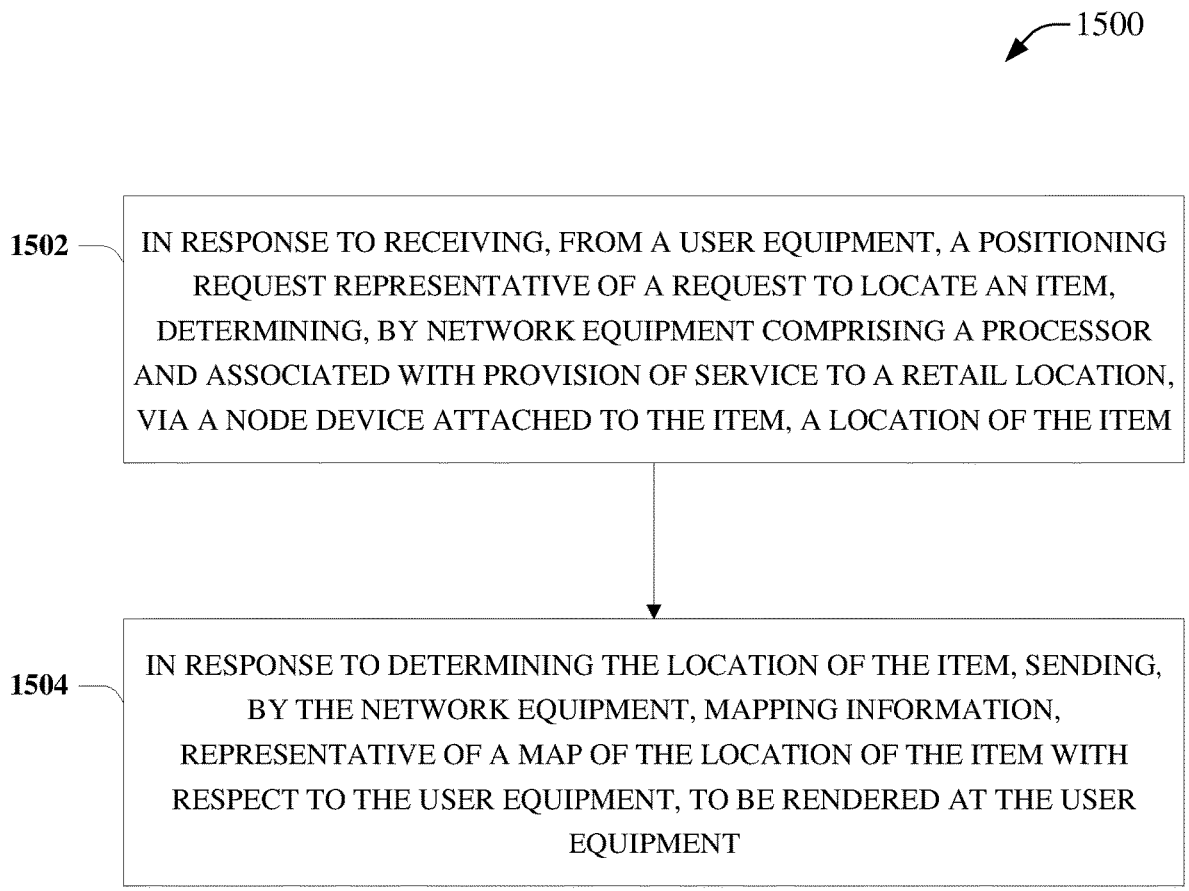
FIG. 15 is a block flow diagram for a process associated with location-based communications in accordance with one or more embodiments described herein.

FIG. 15 illustrates a block flow diagram for a process 1500 associated with location-based communications in accordance with one or more embodiments described herein. At 1502, the process 1500 can comprise, in response to receiving (e.g., via a communication component 114), from a user equipment (e.g., mobile device 120), a positioning request representative of a request to locate an item (e.g., item 908), determining (e.g., via location component 110), by network equipment comprising a processor (e.g., network device 118 or a system herein) and associated with provision of service to a retail location (e.g., and/or entity), via a node device (e.g., node 116) attached to the item (e.g., item 908), a location of the item (e.g., item 908). At 1504, the process 1500 can comprise, in response to determining (e.g., by the location component 110) the location of the item, sending (e.g., via a communication component 114), by the network equipment, mapping information (e.g., generated via a navigation component 304), representative of a map of the location of the item (e.g., item 908) with respect to the user equipment (e.g., mobile device 120), to be rendered at the user equipment (e.g., mobile device 120).

Figure 16:
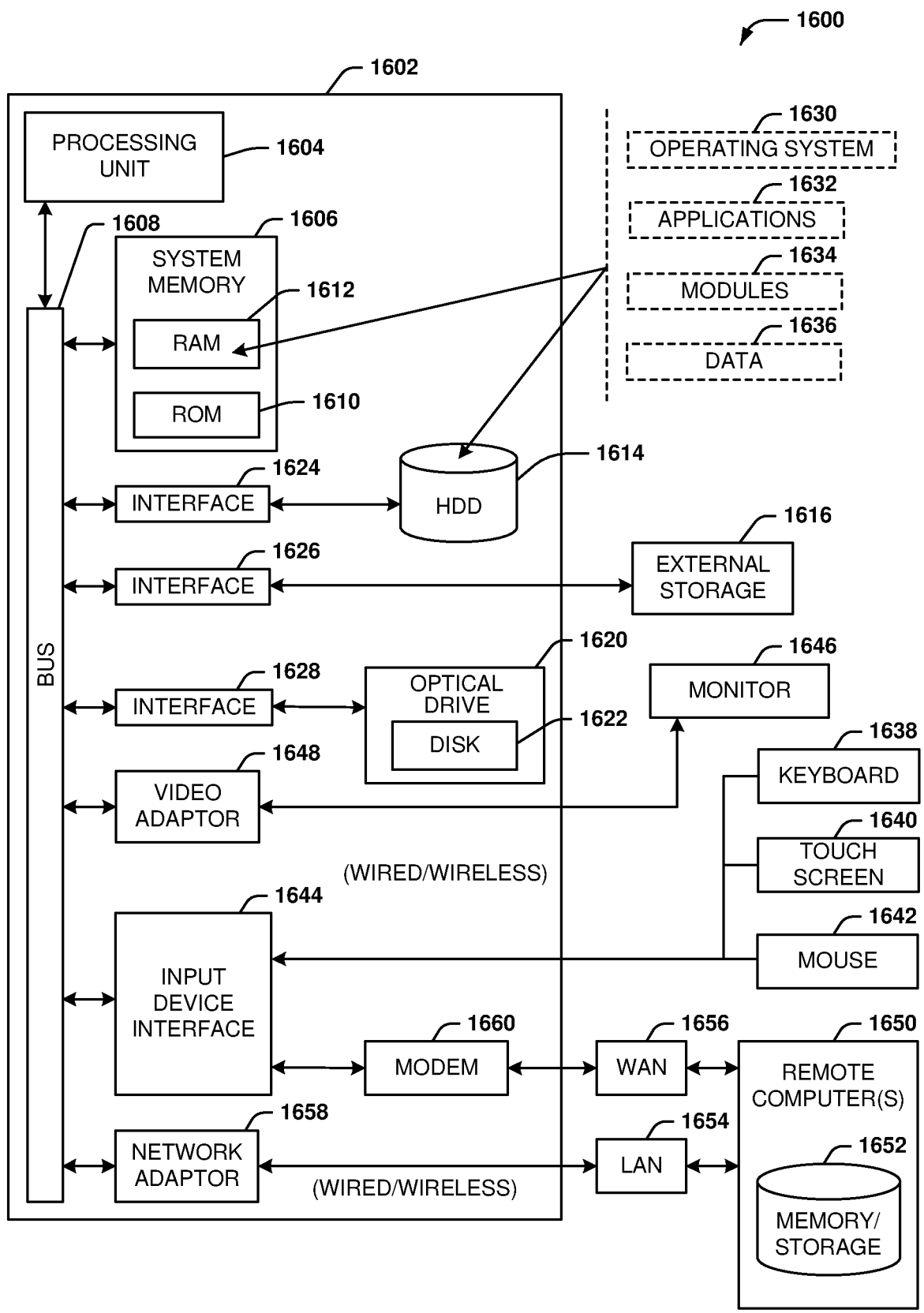
FIG. 16 is an example, non-limiting computing environment in which one or more embodiments described herein can be implemented.

In order to provide additional context for various embodiments described herein, FIG. 16 and the following discussion are intended to provide a brief, general description of a suitable computing environment 1600 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 16, the example environment 1600 for implementing various embodiments of the aspects described herein includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes ROM 1610 and RAM 1612. A basic input/output system (BIOS) can be stored in a non-volatile memory such as ROM, erasable programmable read only memory (EPROM), EEPROM, which BIOS contains the basic routines that help to transfer information between elements within the computer 1602, such as during startup. The RAM 1612 can also include a high-speed RAM such as static RAM for caching data.

The computer 1602 further includes an internal hard disk drive (HDD) 1614 (e.g., EIDE, SATA), one or more external storage devices 1616 (e.g., a magnetic floppy disk drive (FDD) 1616, a memory stick or flash drive reader, a memory card reader, etc.) and an optical disk drive 1620 (e.g., which can read or write from a CD-ROM disc, a DVD, a BD, etc.). While the internal HDD 1614 is illustrated as located within the computer 1602, the internal HDD 1614 can also be configured for external use in a suitable chassis (not shown). Additionally, while not shown in environment 1600, a solid-state drive (SSD) could be used in addition to, or in place of, an HDD 1614. The HDD 1614, external storage device(s) 1616 and optical disk drive 1620 can be connected to the system bus 1608 by an HDD interface 1624, an external storage interface 1626 and an optical drive interface 1628, respectively. The interface 1624 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. The systems and methods described herein can be implemented utilizing various commercially available operating systems or combinations of operating systems.

Computer 1602 can optionally comprise emulation technologies. For example, a hypervisor (not shown) or other intermediary can emulate a hardware environment for operating system 1630, and the emulated hardware can optionally be different from the hardware illustrated in FIG. 16. In such an embodiment, operating system 1630 can comprise one virtual machine (VM) of multiple VMs hosted at computer 1602. Furthermore, operating system 1630 can provide runtime environments, such as the Java runtime environment or the .NET framework, for applications 1632. Runtime environments are consistent execution environments that allow applications 1632 to run on any operating system that includes the runtime environment. Similarly, operating system 1630 can support containers, and applications 1632 can be in the form of containers, which are lightweight, standalone, executable packages of software that include, e.g., code, runtime, system tools, system libraries and settings for an application.

Further, computer 1602 can be enable with a security module, such as a trusted processing module (TPM). For instance, with a TPM, boot components hash next in time boot components, and wait for a match of results to secured values, before loading a next boot component. This process can take place at any layer in the code execution stack of computer 1602, e.g., applied at the application execution level or at the operating system (OS) kernel level, thereby enabling security at any level of code execution.

A user can enter commands and information into the computer 1602 through one or more wired/wireless input devices, e.g., a keyboard 1638, a touch screen 1640, and a pointing device, such as a mouse 1642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1604 through an input device interface 1644 that can be coupled to the system bus 1608, but can be connected by other interfaces, such as a parallel port, an IEEE 1394 serial port, a game port, a USB port, an IR interface, a BLUETOOTH® interface, etc.

A monitor 1646 or other type of display device can be also connected to the system bus 1608 via an interface, such as a video adapter 1648. In addition to the monitor 1646, a computer typically includes other peripheral output devices (not shown), such as speakers, printers, etc.

The computer 1602 can operate in a networked environment using logical connections via wired and/or wireless communications to one or more remote computers, such as a remote computer(s) 1650. The remote computer(s) 1650 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1652 is illustrated. The logical connections depicted include wired/wireless connectivity to a local area network (LAN) 1654 and/or larger networks, e.g., a wide area network (WAN) 1656. Such LAN and WAN networking environments are commonplace in offices and companies, and facilitate enterprise-wide computer networks, such as intranets, all of which can connect to a global communications network, e.g., the Internet.

When used in a LAN networking environment, the computer 1602 can be connected to the local network 1654 through a wired and/or wireless communication network interface or adapter 1658. The adapter 1658 can facilitate wired or wireless communication to the LAN 1654, which can also include a wireless access point (AP) disposed thereon for communicating with the adapter 1658 in a wireless mode.

When used in a WAN networking environment, the computer 1602 can include a modem 1660 or can be connected to a communications server on the WAN 1656 via other means for establishing communications over the WAN 1656, such as by way of the Internet. The modem 1660, which can be internal or external and a wired or wireless device, can be connected to the system bus 1608 via the input device interface 1644. In a networked environment, program modules depicted relative to the computer 1602 or portions thereof, can be stored in the remote memory/storage device 1652. It will be appreciated that the network connections shown are example and other means of establishing a communications link between the computers can be used.

When used in either a LAN or WAN networking environment, the computer 1602 can access cloud storage systems or other network-based storage systems in addition to, or in place of, external storage devices 1616 as described above. Generally, a connection between the computer 1602 and a cloud storage system can be established over a LAN 1654 or WAN 1656 e.g., by the adapter 1658 or modem 1660, respectively. Upon connecting the computer 1602 to an associated cloud storage system, the external storage interface 1626 can, with the aid of the adapter 1658 and/or modem 1660, manage storage provided by the cloud storage system as it would other types of external storage. For instance, the external storage interface 1626 can be configured to provide access to cloud storage sources as if those sources were physically connected to the computer 1602.

The computer 1602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 17:
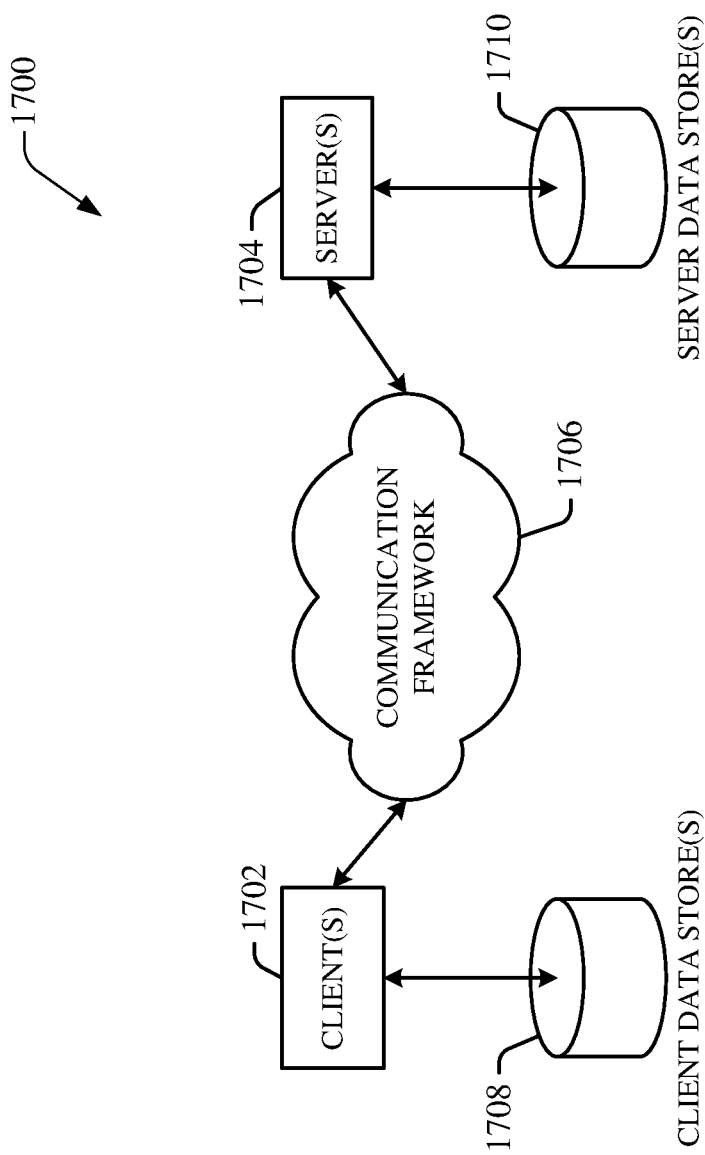
FIG. 17 is an example, non-limiting networking environment in which one or more embodiments described herein can be implemented.

Referring now to FIG. 17, there is illustrated a schematic block diagram of a computing environment 1700 in accordance with this specification. The system 1700 includes one or more client(s) 1702, (e.g., computers, smart phones, tablets, cameras, PDA's). The client(s) 1702 can be hardware and/or software (e.g., threads, processes, computing devices). The client(s) 1702 can house cookie(s) and/or associated contextual information by employing the specification, for example.

The system 1700 also includes one or more server(s) 1704. The server(s) 1704 can also be hardware or hardware in combination with software (e.g., threads, processes, computing devices). The servers 1704 can house threads to perform transformations of media items by employing aspects of this disclosure, for example. One possible communication between a client 1702 and a server 1704 can be in the form of a data packet adapted to be transmitted between two or more computer processes wherein data packets may include coded analyzed headspaces and/or input. The data packet can include a cookie and/or associated contextual information, for example. The system 1700 includes a communication framework 1706 (e.g., a global communication network such as the Internet) that can be employed to facilitate communications between the client(s) 1702 and the server(s) 1704.

Communications can be facilitated via a wired (including optical fiber) and/or wireless technology. The client(s) 1702 are operatively connected to one or more client data store(s) 1708 that can be employed to store information local to the client(s) 1702 (e.g., cookie(s) and/or associated contextual information). Similarly, the server(s) 1704 are operatively connected to one or more server data store(s) 1710 that can be employed to store information local to the servers 1704.

In one exemplary implementation, a client 1702 can transfer an encoded file, (e.g., encoded media item), to server 1704. Server 1704 can store the file, decode the file, or transmit the file to another client 1702. It is noted that a client 1702 can also transfer uncompressed file to a server 1704 and server 1704 can compress the file and/or transform the file in accordance with this disclosure. Likewise, server 1704 can encode information and transmit the information via communication framework 1706 to one or more clients 1702.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a processor; and
   a memory that stores executable instructions that, when executed by the processor, facilitate performance of operations, comprising:
   based on a first network connection of a node of a retail location to network equipment enabling network service for the retail location, determining a first location of the node;
   based on a second network connection of a mobile device to the network equipment, determining a second location of the mobile device;
   determining whether a distance between the first location and the second location satisfies a distance threshold;
   in response to a determination that the distance satisfies the distance threshold, generating message data representative of a message associated with the retail location; and
   sending the message data to the mobile device, for the message to be presented via the mobile device.

2. The system of claim 1, wherein the network equipment comprises radio access network equipment configured for operation according to a fifth generation radio access network protocol.

3. The system of claim 1, wherein the network equipment comprises radio access network equipment configured for operation according to a sixth generation radio access network protocol.

4. The system of claim 1, wherein the message comprises a promotional message for an online purchase associated with the retail location, and wherein the message is generated based on the distance between the first location and the second location.

5. The system of claim 1, wherein the message comprises a navigational instruction to an item, associated with the node, located within the retail location.

6. The system of claim 5, wherein the operations further comprise:
   based on a biometric authentication executed via the mobile device, determining whether a user of the mobile device is an authorized user of the mobile device, wherein sending the message data comprises sending the navigational instruction to be presented via the mobile device in response to a determination that the user is the authorized user.

7. The system of claim 1, wherein the message comprises a first message, and wherein the operations further comprise:
   in further response to the determination that the distance satisfies the distance threshold, displaying, via a display device associated with the retail location and based on the message data, a second message.

8. The system of claim 7, wherein the display device comprises an electronic sign.

9. The system of claim 7, wherein the display device comprises the node.

10. The system of claim 7, wherein the second message comprises a promotional message associated with the retail location.

11. A non-transitory machine-readable medium, comprising executable instructions that, when executed by a processor, facilitate performance of operations, comprising:
    determining, via radio access network equipment serving a coverage area comprising a retail location and via a node device attached to an item associated with a retail entity of the retail location, a first location of the item, wherein the first location is within a geofence; and
    in response to a determination that the item has moved from the first location to a second location, outside of the geofence, generating an alert via an alert device associated with the retail entity.

12. The non-transitory machine-readable medium of claim 11, wherein
    the geofence is a first geofence,
    the retail entity is a first retail entity,
    the second location is within a second geofence, outside of the first geofence, and
    the second location is associated with a second retail entity of the retail location.

13. The non-transitory machine-readable medium of claim 12, wherein the alert is a first alert and the alert device is a first alert device, and wherein the operations further comprise:
    generating a second alert via a second alert device associated with the second retail entity.

14. The non-transitory machine-readable medium of claim 13, wherein the second alert comprises message data representative of a message to return the item to the first geofence.

15. The non-transitory machine-readable medium of claim 11, wherein the radio access network equipment comprises radio access network equipment configured to communicate using a new radio network communication protocol.

16. A method, comprising:
    in response to receiving, from a user equipment, a positioning request representative of a request to locate an item, determining, by network equipment comprising a processor and associated with provision of service to a retail location, via a node device attached to the item, a location of the item; and
    in response to determining the location of the item, sending, by the network equipment, mapping information, representative of a map of the location of the item with respect to the user equipment, to be rendered at the user equipment.

17. The method of claim 16, further comprising:
in response a determination that the user equipment has moved to within a first threshold distance of the location, determining, by the network equipment, whether the user equipment and the item have moved outside of the first threshold distance for a defined duration of time and whether the user equipment and the item have been within a second threshold distance of each other for the defined duration of time; and
in response to a determination that the user equipment and the item have moved outside the first threshold distance for the defined duration of time and that the user equipment and the item have been within the second threshold distance of each other for the defined duration of time, billing, by the network equipment, an account registered with the user equipment and the retail location.

18. The method of claim 17, further comprising:
in response to a determination that the billing of the account was successfully processed, unlocking, by the network equipment, a lock of the node device from the item.

19. The method of claim 16, wherein the network equipment comprises network equipment that communicates according to at least a fifth generation network communication protocol.

20. The method of claim 19, wherein at least the fifth generation network communication protocol comprises a fifth generation millimeter wave network communication protocol.

* * * * *